United States Patent
Inoue

(10) Patent No.: US 7,065,777 B2
(45) Date of Patent: Jun. 20, 2006

(54) PROGRAM GUIDING APPARATUS AND METHOD

(75) Inventor: Tatsu Inoue, Tokyo-to (JP)

(73) Assignee: Pioneer Corporation, Tokyo-to (JP)

( * ) Notice: Subject to any disclaimer, the term of this patent is extended or adjusted under 35 U.S.C. 154(b) by 391 days.

(21) Appl. No.: 09/981,257

(22) Filed: Oct. 18, 2001

(65) Prior Publication Data

US 2002/0044144 A1 Apr. 18, 2002

(30) Foreign Application Priority Data

Oct. 18, 2000 (JP) ............................ P2000-317789

(51) Int. Cl.
*H04N 5/445* (2006.01)
(52) U.S. Cl. ........................... 725/39; 345/204; 725/43
(58) Field of Classification Search ................ 345/204; 348/569, 563, 564, 906; 725/39, 43
See application file for complete search history.

(56) References Cited

U.S. PATENT DOCUMENTS

| | | | |
|---|---|---|---|
| 5,541,738 A * | 7/1996 | Mankovitz | 386/83 |
| 5,559,548 A * | 9/1996 | Davis et al. | 725/40 |
| 5,793,438 A | 8/1998 | Bedard | |
| 5,880,768 A * | 3/1999 | Lemmons et al. | 725/41 |
| 5,929,932 A * | 7/1999 | Otsuki et al. | 725/47 |
| 6,177,931 B1 * | 1/2001 | Alexander et al. | 725/52 |
| 6,389,593 B1 * | 5/2002 | Yamagishi | 725/9 |
| 6,415,437 B1 * | 7/2002 | Ludvig et al. | 725/41 |
| 6,480,208 B1 * | 11/2002 | Eble et al. | 715/807 |
| 6,536,041 B1 * | 3/2003 | Knudson et al. | 725/39 |
| 6,637,029 B1 * | 10/2003 | Maissel et al. | 725/46 |

FOREIGN PATENT DOCUMENTS

| | | |
|---|---|---|
| WO | WO 98/56176 | 12/1998 |
| WO | WO 00/30350 | 5/2000 |

* cited by examiner

Primary Examiner—Guy Lamarre
Assistant Examiner—Fritz Alphonse
(74) Attorney, Agent, or Firm—Sughrue Mion, PLLC

(57) ABSTRACT

A program guide is generated, in which a plurality of program cells are arranged two-dimensionally based on a display priority level set corresponding to each of categories, a display mode corresponding to each of the categories, and program information. Thus, a user can identify a category via the corresponding display mode for displaying the corresponding program cells, in the program guide. The user can also view program cells in the display modes corresponding to respective categories, in the program guide, whereby the user can quickly locate an area or areas crowded with programs belonging to favorite categories.

18 Claims, 23 Drawing Sheets

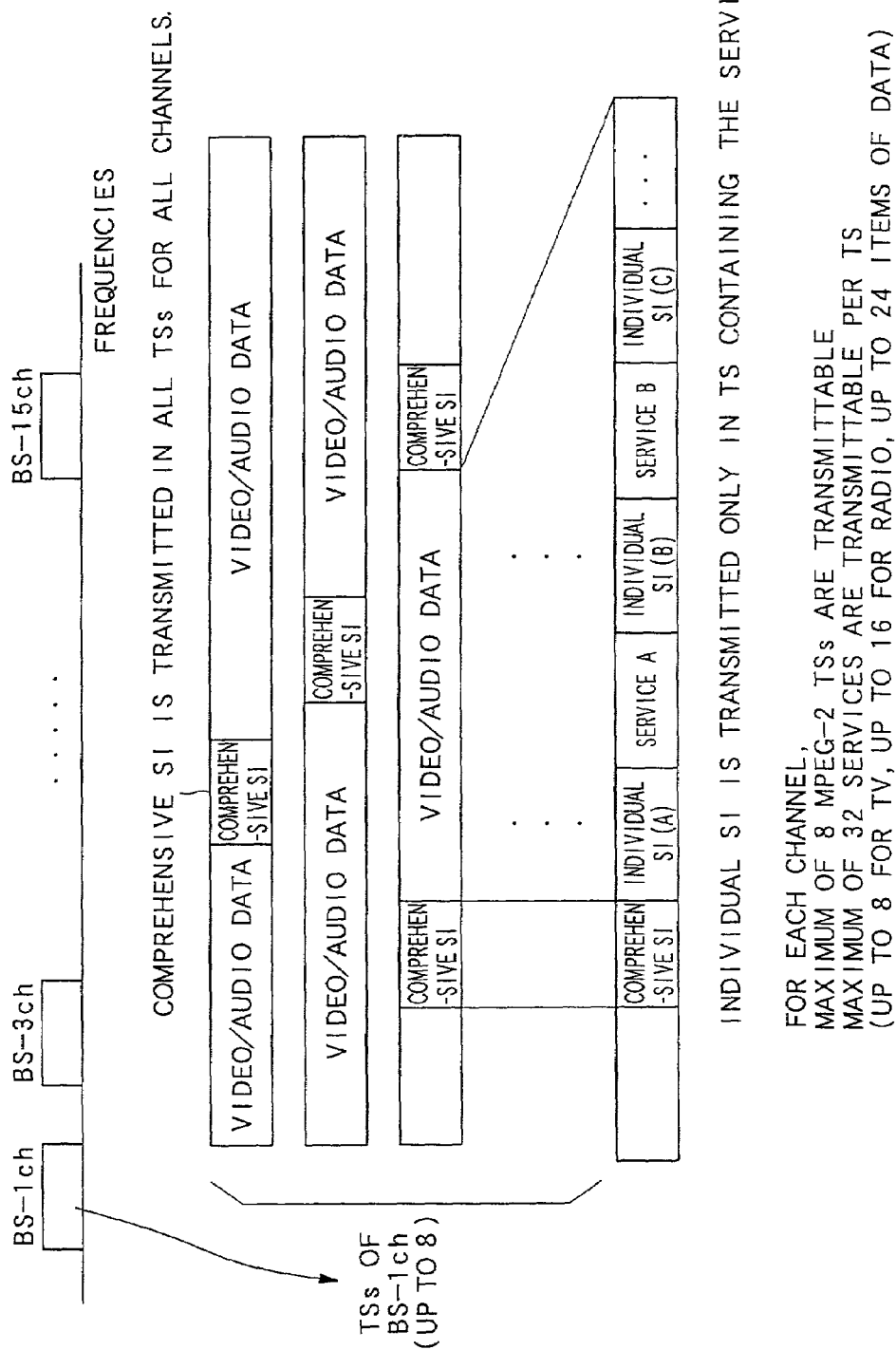

FIG.3

| PROGRAM CODE | PROGRAM TITLE | CHANNEL NUMBER | DATE | START TIME | END TIME | CATEGORY ||||||||||
|---|---|---|---|---|---|---|---|---|---|---|---|---|---|---|---|
| | | | | | | MAIN1 | SUB1 ||| MAIN2 | SUB1 ||| MAIN3 | SUB1 |||
| | | | | | | | SUB1 | SUB2 | SUB3 | | SUB1 | SUB2 | SUB3 | | SUB1 | SUB2 | SUB3 |
| 10000 | PROGRAM 1 | 130ch | MAY 13 | 13:00 | 13:45 | EDUCATION | ENGLISH | — | — | — | — | — | — | — | — | — | — |
| 10001 | PROGRAM 2 | 24ch | EVERY SATURDAY | 17:00 | 17:05 | SPORTS | BASEBALL | — | — | — | — | — | — | — | — | — | — |
| 10002 | PROGRAM 3 | 40ch | MAY 13 | 14:00 | 15:00 | SPORTS | BASEBALL | SOCCER | TENNIS | NEWS | — | — | — | — | — | — | — |
| 10003 | PROGRAM 4 | 145ch | EVERYDAY | 15:15 | 15:45 | MOVIE | ACTION | — | — | — | — | — | — | — | — | — | — |
| 10004 | PROGRAM 5 | 130ch | MAY 13 | 17:00 | 19:00 | MOVIE | CARTOON | — | — | — | — | — | — | — | — | — | — |
| 10005 | PROGRAM 6 | 56ch | MAY 13 | 19:30 | 20:00 | MUSIC | POP MUSIC | JAZZ | — | — | — | — | — | — | — | — | — |
| 10006 | PROGRAM 7 | 56ch | MAY 13 | 20:00 | 21:00 | COOKING | — | — | — | — | — | — | — | — | — | — | — |
| 10007 | PROGRAM 8 | 56ch | MAY 13 | 20:30 | 21:00 | DOCU-MENTARY | — | — | — | TRAVEL | AFRICA | — | — | — | — | — | — |
| ... | ... | ... | ... | ... | ... | ... | ... | ... | ... | ... | ... | ... | ... | ... | ... | ... | ... |

FIG.4

| CATEGORY | DISPLAY PRIORITY LEVEL | DISPLAY FLAG | DISPLAY MODE |
|---|---|---|---|
| VARIETY | A | 1 | RED |
| SPORTS | B | 1 | YELLOW |
| MOVIE | C | 1 | BLUE |
| MUSIC | D | | GREEN |
| DRAMA | E | | ORANGE |
| NEWS | D | | REDDISH PURPLE |
| CARTOON | F | | RED |
| DOCUMENTARY | G | | BLUISH GREEN |
| ... | ... | | ... |

DISPLAY PRIORITY LEVEL/DISPLAY MODE
SETTING SCREEN

| CATEGORY | DISPLAY PRIORITY LEVEL | DISPLAY MODE |
|---|---|---|
| VIERIETY | A | RED |
| SPORTS | B | YELLOW |
| MOVIE | C | BLUE |
| MUSIC | D | GREEN |
| DRAMA | E | ORANGE |
| NEWS | D | REDDISH PURPLE |
| CARTOON | F | RED |
| DOCUMENTARY | G | BLUISH GREEN |
| ... | ... | ... |

| CORRESPONDENCE TABLE ||
|---|---|
| DISPLAY PRIORITY LEVEL | DISPLAY MODE |
| 1 : A | 1 : YELLOW |
| 2 : B | 2 : RED |
| 3 : C | 3 : ORANGE |
| 4 : D | 4 : BLUE |
| 5 : E | 5 : GREEN |
| 6 : F | 6 : PURPLE |
| 7 : G | 7 : BLUISH GREEN |
| 8 : H | 8 : REDDISH PURPLE |
| . | . |
| . | . |

PROGRAM GUIDING APPARATUS AND METHOD

BACKGROUND OF THE INVENTION

1. Field of the Invention

The present invention relates to electronic program guides.

2. Description of Related Art

Digital broadcasting systems are operated in recent years, which transmit digitized television signals via satellites, such as broadcasting satellites and communication satellites, for reception by viewers so that they can watch television programs at home. A system of this type can provide so many channels that a multitude of programs can be aired.

Such a system transmits, from a satellite to a receiver at each viewer's home, information about an electronic program guide (EPG) indicative of contents of these many programs together with their video/audio data. At home, the user operates the receiver to display the EPG on a TV display. Over the EPG displayed on the TV display, the user can search for programs, tune to programs to view/record them, and schedule programs for viewing/recording.

However, the EPG provides well over 100 programs, and all of them cannot be displayed within a single program guide screen.

Thus, the user cannot browse through a large EPG page at once, and hence encounters difficulty quickly locating particular channels and time slots associated with programs which fall into his/her favorite display mode for displaying the corresponding program cells, in the program guide. The user can also view program cells in the display modes corresponding to respective categories, in the program guide, whereby the user can quickly locate an area or areas crowded with programs belonging to his/her favorite categories. Further, the user can set the display priority level for each category, and hence can rank the categories which he/she wishes to display in the program guide, and can display the program cells based on the rankings in the program guide, whereby the user can create his/her own program guide.

Further, the program guide allows the user to identify a category via the corresponding display mode for displaying the corresponding program cells, and hence, there is no need to enter a lot of textual information in each program cell as in conventional equivalents, whereby a greater number of program cells can be displayed within a single screen.

In one aspect of the program guiding apparatus of the present invention, the program guiding apparatus is provided with: a device for displaying said generated program guide on a two-dimensional screen; a device for accepting a selection of one of said plurality of program cells arranged on said displayed program guide; and a device for generating an information display screen in a display mode related to said display mode for displaying said selected program cell and displaying predetermined information related to said selected program cell in said information display screen.

According to this aspect, a user can selects program cell and check the program cell information.

In another aspect of the program guiding apparatus of the present invention, the program guiding apparatus is provided with: a device for displaying said generated program guide on a two-dimensional screen; a device for accepting a selection of one of said plurality of program cells arranged on said displayed program guide; and a device for generating an information display screen in a display mode related to said display mode for displaying said selected program cell and displaying predetermined information related to said selected program cell in said information display screen; wherein said predetermined information includes program information corresponding to said program cell.

According to this aspect, the user can check program information, which he/she cannot check with the program cell, in the information display screen corresponding to the program cell.

In further aspect of the program guiding apparatus of the present invention, the program guiding apparatus is provided with: a device for displaying said generated program guide on a two-dimensional screen; a device for accepting a designation of an area including at least one program cell on said displayed program guide; and a device for displaying information based on a predetermined attribute related to at least one program corresponding to at least one program cell included in said designated predetermined area.

According to this aspect, the user can check information based on a predetermined attribute related to programs, in the program guide easily.

In further aspect of the program guiding apparatus of the present invention, the program guiding apparatus is provided with: a device for displaying said generated program guide on a two-dimensional screen; a device for accepting a designation of an area including at least one program cell on said displayed program guide; and a device for collecting statistics on a predetermined program attribute for at least one program corresponding to said at least one program cell included in said designated predetermined area.

According to this aspect, the user can collect statistics on a predetermined attribute as to programs within a user-designated area. For example, the user can collect statistics regarding programs in which a particular entertainer appears.

In further aspect of the program guiding apparatus of the present invention, the program guiding apparatus is provided with: a device for displaying said generated program guide on a two-dimensional screen; a device for accepting a designation of an area including at least one program cell on said displayed program guide; and a device for collecting statistics on a predetermined program attribute for at least one program corresponding to said at least one program cell included in said designated predetermined area; wherein said collected statistics are displayed on said program guide.

According to this aspect, the user can check the statistical result.

In further aspect of the program guiding apparatus of the present invention, the program guiding apparatus is provided with: a device for displaying said generated program guide on a two-dimensional screen; and a search device for searching for an area in which a predetermined program attribute satisfies a predetermined condition, in said program guide, and indicating said searched area in said program guide.

According to this aspect, the user can search for an area in which a predetermined program attribute satisfies a predetermined condition, for example, an area having five or more programs falling into a category or categories added to a table as favorites.

In further aspect of the program guiding apparatus of the present invention, the program guiding apparatus is provided with: a device for displaying said generated program guide on a two-dimensional screen; a search device for searching for an area in which a predetermined program attribute satisfies a predetermined condition, in said program guide, and indicating said searched area in said program guide; and a device for accepting a direction to move said searched area, wherein said search device searches for another area in which said predetermined program attribute satisfies said predetermined condition, other than said previously searched area, every time said search device accepts said direction to move the area.

According to this aspect, the user can search for and check areas in which a predetermined program attribute satisfies a predetermined condition one after another.

In further aspect of the program guiding apparatus of the present invention, said display priority level is automatically set based on a history by a user.

According to this aspect, the time and labor, setting a display priority level, on the part of the user can be reduced.

In further aspect of the program guiding apparatus of the present invention, said display priority level is set by a user.

According to this aspect, the user can set the display priority level as he/she likes.

In further aspect of the program guiding apparatus of the present invention, said display mode includes a shape, a pattern, and a color of a program cell, or combinations thereof.

According to this aspect, a user can check a program cell information easily.

In further aspect of the program guiding apparatus of the present invention, there are a plurality of categories, and wherein said display priority level and said display mode are set for each of said plurality of categories to display program cells corresponding to said each of said plurality of categories.

According to this aspect, a user can check a program cell easily.

The above object of the present invention can be achieved by the following program guiding method of the present invention. The program guiding method is provided with the steps of: storing program information including a category to which a program belongs; setting a display priority level for displaying a program cell corresponding to said category; setting a display mode for displaying said program cell corresponding to said category; and generating a program guide in which a plurality of program cells are arranged two-dimensionally based on said display priority level, said display mode, and said program information.

According to this aspect, a program guide is generated, in which a plurality of program cells are arranged two-dimensionally based on a display priority level set corresponding to each of categories, a display mode corresponding to each of the categories, and program information. Thus, a user can identify a category via the corresponding display mode for displaying the corresponding program cells, in the program guide. The user can also view program cells in the display modes corresponding to respective categories, in the program guide, whereby the user can quickly locate an area or areas crowded with programs belonging to his/her favorite categories. Further, the user can set the display priority level for each category, and hence can rank the categories which he/she wishes to display in the program guide, and can display the program cells based on the rankings in the program guide, whereby the user can create his/her own program guide.

Further, the program guide allows the user to identify a category via the corresponding display mode for displaying the corresponding program cells, and hence, there is no need to enter a lot of textual information in each program cell as in conventional equivalents, whereby a greater number of program cells can be displayed within a single screen.

BRIEF DESCRIPTION OF THE DRAWINGS

FIG. 2 is a diagram showing a data transmission method in digital broadcasting;

FIG. 3 shows an example of information included in SI stored in a RAM;

FIG. 4 shows an example of information managed by a program cell display management table;

FIG. 10 shows an example of a Display Priority Level/Display Mode Setting screen;

DETAILED DESCRIPTION OF THE PREFERRED EMBODIMENTS

Figure 1:
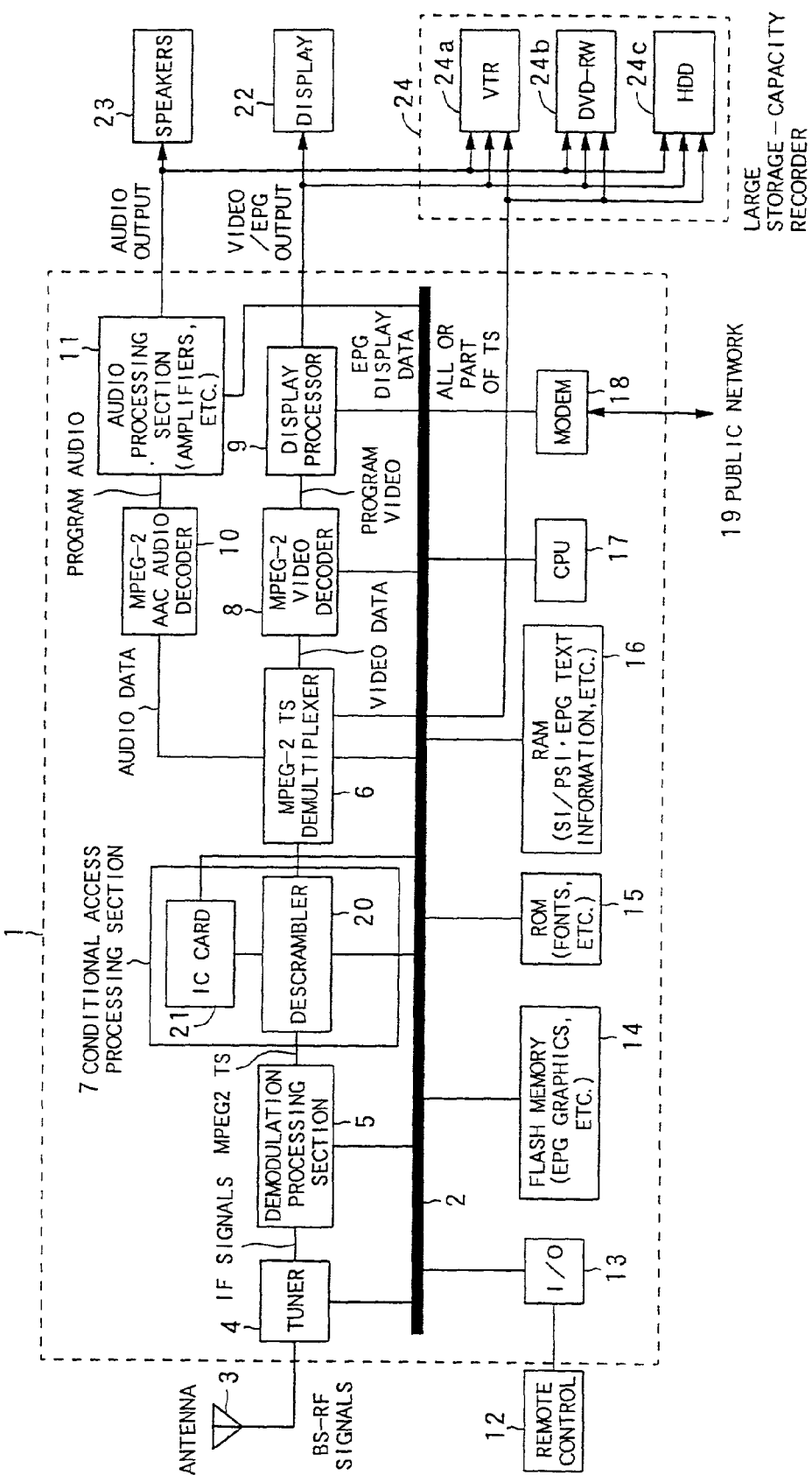
FIG. 1 is a block diagram showing the configuration of a satellite digital broadcast receiver according to an embodiment of the present invention.

The present invention will now be described with reference to a preferred embodiment shown in the drawings.

FIG. 1 shows the configuration of a satellite digital broadcast receiver according to an embodiment of the present invention. The satellite digital broadcast receiver 1 shown in FIG. 1, installed in the home of a viewer, receives digital broadcast signals (broadcast waves) from a satellite to display a television (TV) program on a home TV screen. At the same time, the receiver 1 receives information about an electronic program guide (EPG) sent from the satellite to display the information on the TV screen as instructed by the viewer.

As shown in FIG. 1, the receiver 1 has various components connected to a bus 2. The receiver 1 can also be operated by an attached remote control 12.

The broadcast waves (BS-RF signals) transmitted from the satellite are received by an antenna 3, and then sent to a tuner 4 within the receiver 1. The broadcast waves include TV video/audio information (hereinafter referred to as "TV program information"), and SI or "service information" used to display the EPG. The tuner 4 tunes to a user-selected band, and converts the received signal waves to intermediate frequency (IF) signals for application to a demodulation processing section 5. The section 5 demodulates the input digital signals, subjects the demodulated signals to data frame reformatting, error correction and other processes, and supplies the resulting signals to a demultiplexer 6 in an MPEG-2 transport stream (TS) format through a descrambler 20.

The demultiplexer 6 separates the audio and video data of a specified service from the input MPEG-2 TS format data for application to an audio decoder 10 and a video decoder 8, respectively. Here, the audio data is coded in an MPEG-2 AAC format and the video data in an MPEG-2 video format. The audio decoder 10 decodes the input audio data to generate program audio data for application to an audio processing section 11. The section 11, including amplifiers, performs predetermined audio signal processes to generate an audio output to audio speakers 23.

On the other hand, the video decoder 8 decodes the input video data to generate program video data for application to a display processor 9. The processor 9 subjects the input program video data to predetermined processes to generate a video output to a display 22. The display processor 9 also superimposes textual information, etc. on program pictures displayed on the display 22. EPG display data to be described below is superimposed on or replaced with the program video data by the display processor 9, for output to the display 22.

Here, a large storage-capacity recorder 24 (e.g., a VTR 24a) receives audio signals from the audio processing section 11, video signals from the display processor 9, and all or part of the TS data from the demultiplexer 6 for recording into a recording medium.

The demultiplexer 6 further separates SI-containing data (data other than the TV program information) from the input MPEG-2 TS data. The SI provides the basis for the EPG display data, and is thus utilized for EPG display processes. The SI and other data separated by the demultiplexer 6 is stored in a RAM 16. A nonvolatile RAM is used as the RAM 16.

A flash memory 14 stores various graphic data (program grids, and predetermined symbols including channel logos) needed for EPG display, and a ROM 15 stores font data, etc. for use as EPG text.

A conditional access processing section 7 performs the following processes. Conditional access, which is available only to those who have made a subscription contract with a broadcasting business, provides information on a service or program basis, and the relevant encrypted MPEG-2 TS data is transmitted to the subscribers. The conditional access processing section 7 is comprised of a decryption processing section or descrambler 20, and an IC card 21 in which contract information is recorded. A service center jointly operated by the broadcasting businesses sends an IC card 21 to each subscribing user. The contract information recorded in each card 21, which includes subscription terms as to whether the user is permitted or prohibited to view programs, generally differs from one user to another. The subscription terms define subscribable channels and programs on a monthly or yearly basis, for example. If the user selects a conditional access program, the conditional access processing section 7, using both the terms of contract and the decryption-related information obtained from the broadcast waves, decrypts the MPEG-2 TS data, if the user is a subscriber to this service, so that the user can view that conditional access program. If the user is not a subscriber, however, the MPEG-2 TS data is not decrypted, so that the user cannot view that program. In the latter case, text informing that the user cannot view the program, which is stored in the ROM 15, etc., is displayed on an EPG display screen.

For pay-per-view programs, purchases are recorded in the IC card 21 every time the user purchases a program, and the user's pay-per-view program purchase information is periodically transmitted from the receiver 1 to a program distributor via a modem 18 and a public network 19.

Instructions input by the user using the remote control 12 is transferred to a CPU 17 via an interface 13. The CPU 17, recognizing the user's instructions, controls the components of the receiver 1 accordingly. For example, the CPU 17 directs the tuner 4 to tune to a user-designated channel.

To display EPG data, the CPU 17 prepares EPG text data by referencing the SI, etc. stored in the RAM 16. The CPU 17 then prepares EPG display data, using the graphic data such as the EPG grid data stored in the flash memory 14, the font data in the ROM 15, and the EPG text data in the RAM 16, for application to the display processor 9. The processor 9, based on a switching instruction from the CPU 17, either switches the program video data from the video decoder 8 to the EPG display data, or superimposes the EPG display data upon the program video data, for output to the display 22 as the video signals.

Further, the public network 19 is connected to the bus 2 through the modem 18 to which a user's telephone or personal computer is connected, for necessary communication between broadcast stations and the user's home.

The receiver 1, which is configured as described above, functions as a program guiding apparatus of the present invention.

Next, digital signals transmitted from the satellite as original data for the EPG display data will be described. FIG. 2 schematically shows a digital signal data format. As shown in the figure, multiple BS channels (bands) are arranged in a satellite digital broadcasting system, enabling each BS channel to transmit up to eight MPEG-2 TSs and each TS to include up to thirty-two services. In the following description, the term "BS channel" is used to mean a frequency band in satellite broadcasting, as distinguished from a channel through which the receiver 1 receives broadcast programs.

Each TS includes comprehensive SI which is multiplexed with video/audio information. The term "comprehensive SI" means the SI of all broadcasting stations, including program schedule information of all their channels. That is, a single version of the comprehensive SI is transmitted while multiplexed in all TSs of all the BS channels. With this arrangement, no matter which channel the viewer is tuned to, the viewer can acquire the comprehensive SI included in any TS of that tuned channel to prepare EPG data for all the channels. Specifically, the CPU 17 shown in FIG. 1 controls the demultiplexer 6 to acquire the comprehensive SI from the currently received TS for preparation of the EPG text data based on the acquired SI.

FIG. 2 also shows, in its lower part, a video/audio data format for each TS. As mentioned above, each TS can transmit a maximum of 32 services, and these 32 services are time-division-multiplexed in the form of packets. In the example shown in FIG. 2, in the lowermost TS, services provided by multiple broadcast stations (services A, B, etc.) are time-division-multiplexed. To receive the service A, for example, the CPU 17 causes the tuner 4 of FIG. 1 to tune to a BS channel including a particular TS. Then, the demodulation processing section 5 of FIG. 1 specifies and extracts the particular TS from the plurality of TSs included in that BS channel, and further the demultiplexer 6 extracts the service A, which is time-division-multiplexed in the particular TS, by referencing its identifier.

Here, as shown in FIG. 2, individual station data (indicated by the services A, B, etc.) includes individual SI describing each service. In the example of FIG. 2, each individual SI precedes the service data for convenience sake. The individual SI is similar to the comprehensive SI, but is different in that the individual SI includes information unique to itself which is not included in the comprehensive SI. That is, the comprehensive SI includes information needed to display an EPG for all the channels, while the individual SI includes, for example, detailed information about each program. Thus, the CPU 17 of FIG. 1 acquires individual SI as instructed by the user to display the detailed information about a specific program.

Next, information including SI which is stored in the RAM 16 and referenced by the CPU 17 for display of the EPG will be described in detail. FIG. 3 shows an example of information included in the SI stored in the RAM 16. As shown in the figure, the SI includes category information, in addition to the channel number, date, start time, end time, etc. of each program. A maximum of three main categories is set per program. For example, for "sports news", two main categories, "sports" and "news", are set, as for program 3 shown in FIG. 3. Further, each main category includes a maximum of three subcategories, so that each program can have a maximum of nine subcategories. For example, for the program 3 shown in FIG. 3, three subcategories, "baseball", "soccer", and "tennis", are set. Such categorization is provided by broadcast stations in advance.

The RAM 16 also stores a program cell display management table that manages information about the display priority level and the display mode which are set for each category in order to display the cells of programs belonging to the corresponding category. FIG. 4 shows an example of information to be managed by a program cell display management table 25. Here, the term "display priority level" means how each category is ranked in a group of categories. That is, the higher a category is ranked, the more the user likes that category. The table 25 shown in FIG. 4 lists the display priority levels in alphabetical order with "A" being the highest. The user can select which and how program cells are to be displayed, in an All-at-a-Glance EPG which will be described below. That is, the user can narrow the categories to those ranked at a particular display level or higher (e.g., "B" or higher) to display program cells for only such programs as belonging to the thus narrowed categories. In the example of FIG. 4, the priority level "A" is given to a category "variety", meaning that the user wishes to display the cells of programs categorized into "variety" in the All-at-a-Glance EPG first.

Further, the user can set the same display priority level ("D" in the example of FIG. 4) for a plurality of categories, such as for "music" and "news" in the same example.

Still further, as mentioned above, the user can set a total of 3 main categories and a total of 9 subcategories for each program, and thus there may be cases where a single program belongs to a plurality of categories. In such cases, the display priority level is set for a representative category. The user can select a representative category over an EPG screen, etc. If the user does not select a representative category, a category, which is "main 1" in the example of FIG. 3, is automatically selected, for example.

Further, display flags shown in FIG. 4 indicate that the cells of programs belonging to the flagged categories are to be displayed in the display modes corresponding to the respective categories. That is, the display flags function to narrow the categories to those ranked at a particular level or higher, in displaying program cells. In the example of FIG. 4, the display flags are set to "1" for the levels "A", "B", and "C", and this means that the cells of programs belonging to the narrowed categories ranked at the display priority level "C" or higher are to be displayed in their corresponding display modes.

Further, the display mode for displaying a program cell is set for each category, and includes the shape, pattern, and color of the program cell, and their combinations. FIG. 4 shows an example in which the display mode is set by color such that the cells of programs respectively belonging to different categories are colored differently. For example, red is assigned to "variety", meaning that the cells of programs categorized into "variety" are to be colored red in the All-at-a-Glance EPG which will be described below. Further, the user can select the same display mode (red in the example of FIG. 4) for a plurality of categories, such as for "variety" and "cartoon" in the same example.

Figure 5:
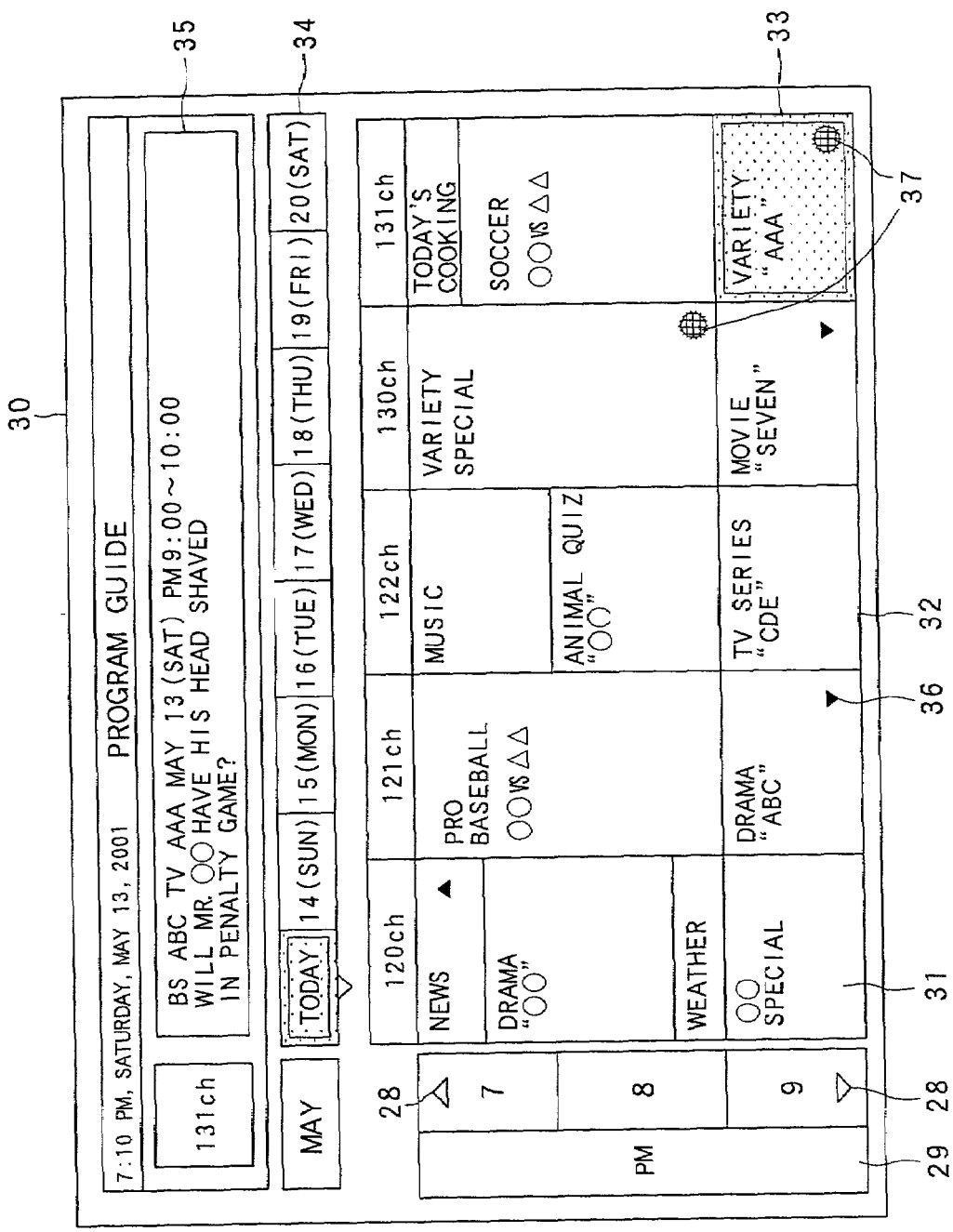
FIG. 5 shows an example of a screen displaying a Day EPG.

Next, EPG display screens will be described. FIG. 5 shows an example of a basic EPG display screen. This EPG display screen displays a program guide for multiple channels on a day-of-the-week basis, and will hereinafter be called as "Day EPG". The Day EPG 30 is displayed by pressing an "EPG key" 91 (described below) on the remote control 12.

The Day EPG 30 displays current date/time information in its uppermost area. The Day EPG 30 includes program guides for eight days from the current day to the same day of the next week as shown in the FIG. 5. The Day EPG 30 provides a program guide embracing all the channels for each day. When the user specifies a desired day with a Day tab 34, a program guide for that day appears on the screen. Every time the user presses a "Day Change key" 92 (described below) on the remote control 12, a program guide for the next day appears. Once the program guide for the seventh day has been displayed, the user is returned to the program guide for the current day.

The program guide is displayed in a program grid 32, in which program cells 31 are arranged. A time slot area 29 is arranged as a column to the left of the program grid 32. In the example of FIG. 5, a program guide is displayed, which lists programs from 7 to 10 in evening time slots on Saturday, May 13. Each cell 31 includes the tile, outline, and other information about a program to be aired in the relevant time slot displayed in the time slot area 29. Channels are listed in a row above the program grid 32.

Some program cells 31 include a continuation mark 36, indicating that the marked program, which is long, extends in the direction of time axis pointed by the arrow beyond the program grid 32. A scroll mark 28 allows the user to scroll through the screen in the pointed direction. In some other cells 31, displayed are Favorite Category icons 37. The Favorite Category icon 37 indicates that a category to which the marked program belongs is added as a favorite to the table 25 with its display priority level set to "A" (such a category will hereinafter be referred to as "level 'A' category" whenever applicable). The level "A" categories may be marked with their display priority level instead of Favorite Category icons 37, and the cells 31 of programs belonging to categories ranked "B", "C" and so on may similarly be marked with their display priority levels "B", "C" and so on.

The program highlighted by a cursor 33 is the program currently selected by the user. An outline of the currently selected program is displayed in an outline area 35 in the upper part of FIG. 5. The outline text is generated based on comprehensive SI included in each of the above-mentioned TSs.

Figure 6:
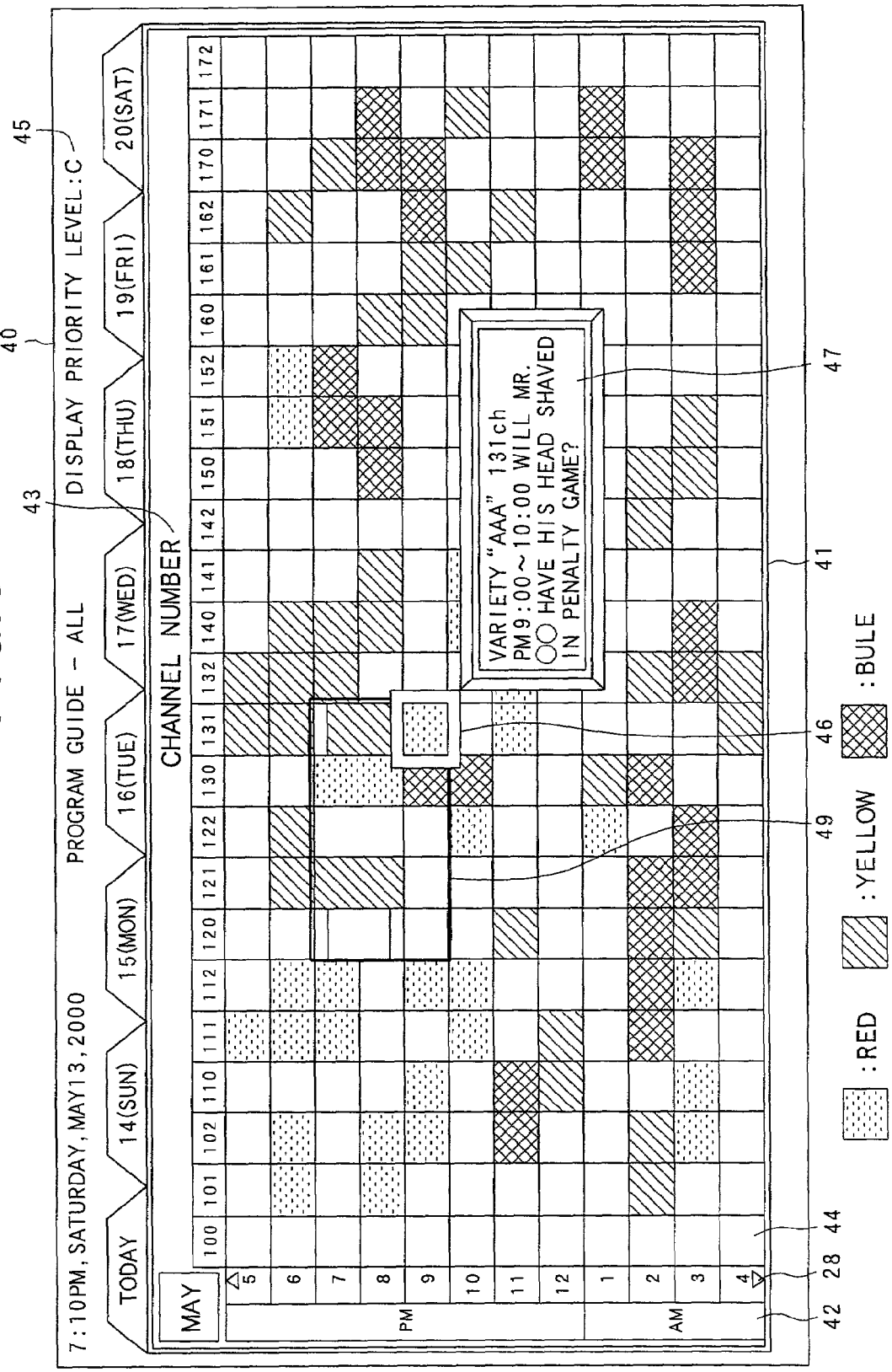
FIG. 6 shows an example of a screen displaying an All-at-a-Glance EPG.

FIG. 6 shows an example of a screen displaying the All-at-a-Glance EPG, which is a key feature of the present invention. The All-at-a-Glance EPG (hereinafter referred to simply as "All EPG") 40 shown in the figure appears when an "All-at-a-Glance key" 95 is pressed on the remote control 12. Likewise in the Day EPG 30, in the All EPG 40, a time slot area 42 is arranged as a column to the left of a program grid 41. In the example of FIG. 6, a program guide is displayed, which lists programs in time slots from 5 p.m. on Saturday, May 13 to 5 a.m. on the next day. A channel display area 43 is arranged in a row above the program grid 41. A field (denoted by reference numeral 49) surrounded by a broken line in the program grid 41 of the EPG 40 corresponds to the program grid 32 of the Day EPG 30. It should be noted that the program cells 46 other than those in the field 49 are depicted as having the same interval of time (one hour) for convenience sake. Thus, the size of the program grid 41 of the All EPG 40 is far larger than that of the program grid 32 of the Day EPG 30 in terms of the number of cells displayed. That is, a greater number of program cells 44 can be displayed over a single screen.

The program grid 41 is similar to that in the Day EPG 30 in that the grid 41 includes the cells 44 of programs corresponding to their time slots, but is different in that information including the title and outline of each program is not displayed in the corresponding cell 44. Each cell 44 is displayed based on the display priority level, display flag, and display mode managed by the program cell display management table 25. For example, the All EPG 40 shown in FIG. 6 is displayed based on the table 25 shown in FIG. 4; i.e., the cells 44 of programs belonging to the flagged categories ranked "A" to "C" are displayed in the display modes corresponding to the respective categories. Further, the display priority level denoted by reference numeral 45 indicates that the cells 44 of programs belonging to categories ranked at that display priority level or higher ("C" or higher in the example of FIG. 6) are to be displayed in the display modes corresponding to the respective categories, and the display priority level 45 corresponds to the display flags set in the program cell display management table 25.

Further, in the example of FIG. 6, the cells 44 of programs belonging to unflagged categories (ranked "D", "E", "F" and so on) are not displayed in the respective display modes managed by the table 25, but are masked in white. Alternatively, the program cells 44 corresponding to unflagged categories may be masked in black, a translucent color (such that their pictures are seen through), or in other inconspicuous colors, or may not be displayed at all.

Still further, the program cells 44 colored red in the example of FIG. 6 correspond to the cells 31 marked with the Favorite Category icons 37 in the Day EPG 30 screen.

Further, the user can select a program cell 44 with a cursor 46 also in the All EPG 40. The selected program cell 44 pops up as shown in FIG. 6. A subscreen 47 displaying information about the selected program cell 44 pops up on the All EPG 40. The subscreen 47 displays the title, outline, and other information about the program corresponding to the selected cell 44. The subscreen 47 thus allows the user to look into the program information which he/she cannot check with the program cell 44. The information in the subscreen 47 is displayed in a mode related to the selected cell 44. For example, if the cell 44 is colored red, the corresponding subscreen 47 is also colored red. Further, the scroll marks 28 indicate that the display screen is scrollable in the directions pointed by the marks 28, likewise in the Day EPG 30.

Figure 7:
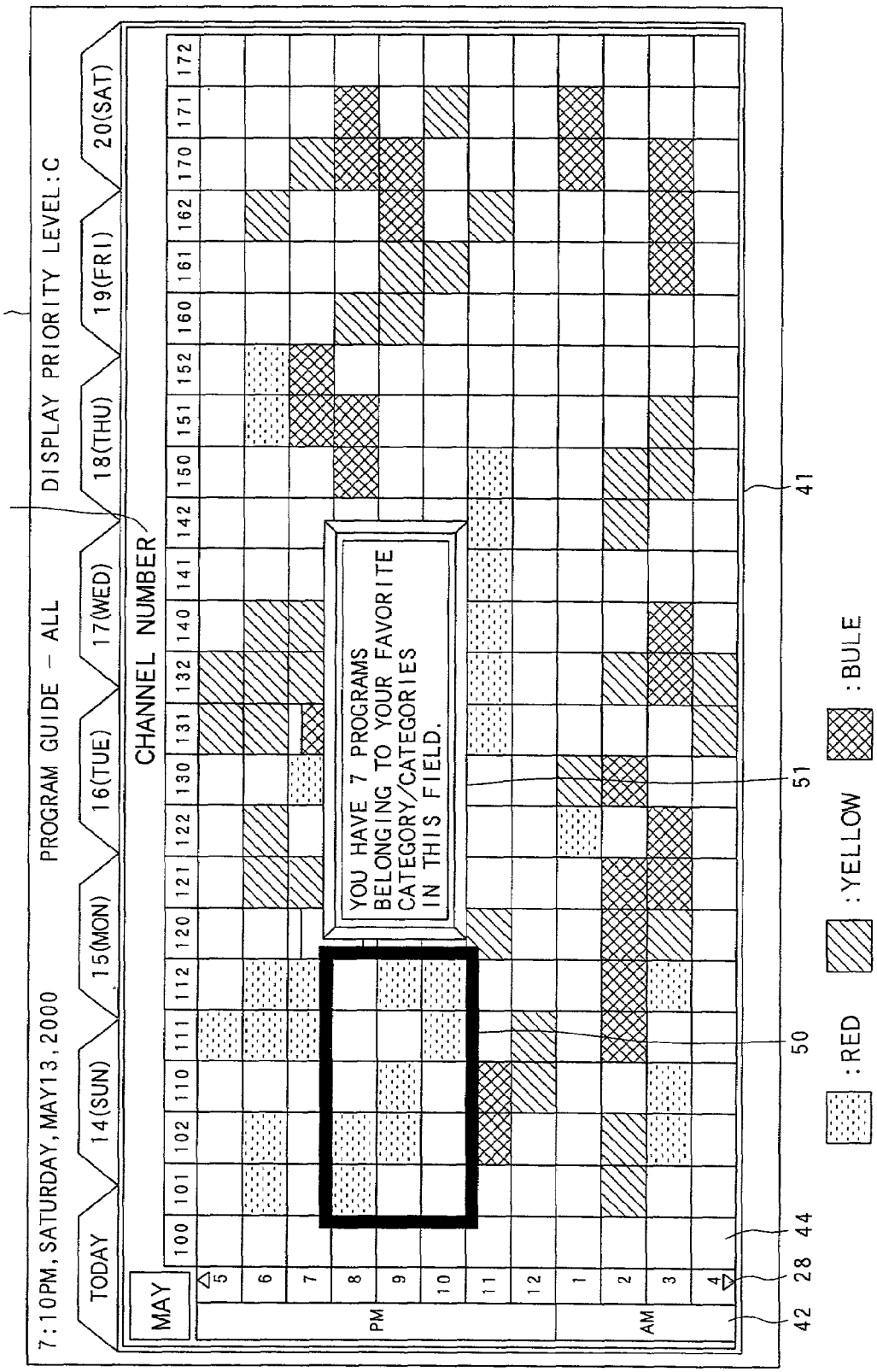
FIG. 7 shows an example of a statistical result regarding programs belonging to a Display Priority Level "A" category.

The All EPG 40 screen also allows the user to collect statistics on predetermined attributes for programs within a user-designated predetermined area, the predetermined attributes including display priority level, category, and performer. FIG. 7 shows an example in which the user collects statistics on the level "A" category for programs. In this example, the area for collection of statistics is demarcated as a field 50 which corresponds to the program grid 32 in the Day EPG 30. Further, in this example, the statistical result about the programs falling into the level "A" category, i.e., the number of program cells 44 colored red are displayed in a popped up information subscreen 51. It may also be configured such that the user can set the field 50 to a desired size.

Figure 8:
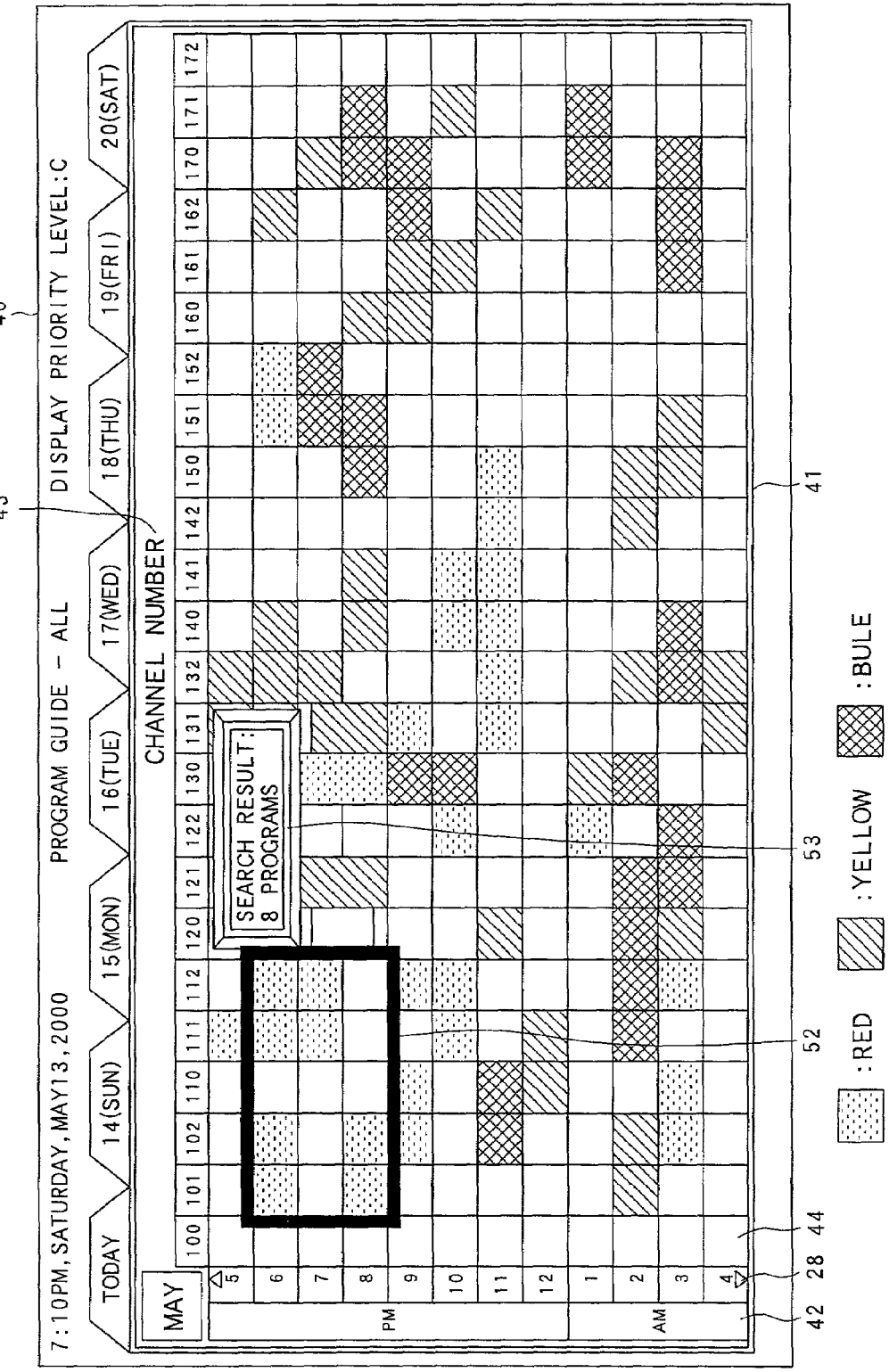
FIG. 8 shows an example of the result of a search for an area having 5 or more programs belonging to a Display Priority Level "A" category.

The All EPG 40 screen also allows the user to search for an area satisfying a predetermined condition as to an attribute. FIG. 8 shows an example in which such an area including five or more programs belonging to the level "A" category is searched. In this example, the searched area is indicated by a field 52, together with a popped up subscreen 53 which informs the user of the search result. It may likewise be configured such that the user can set the field 52 to a desired size.

Figure 9:
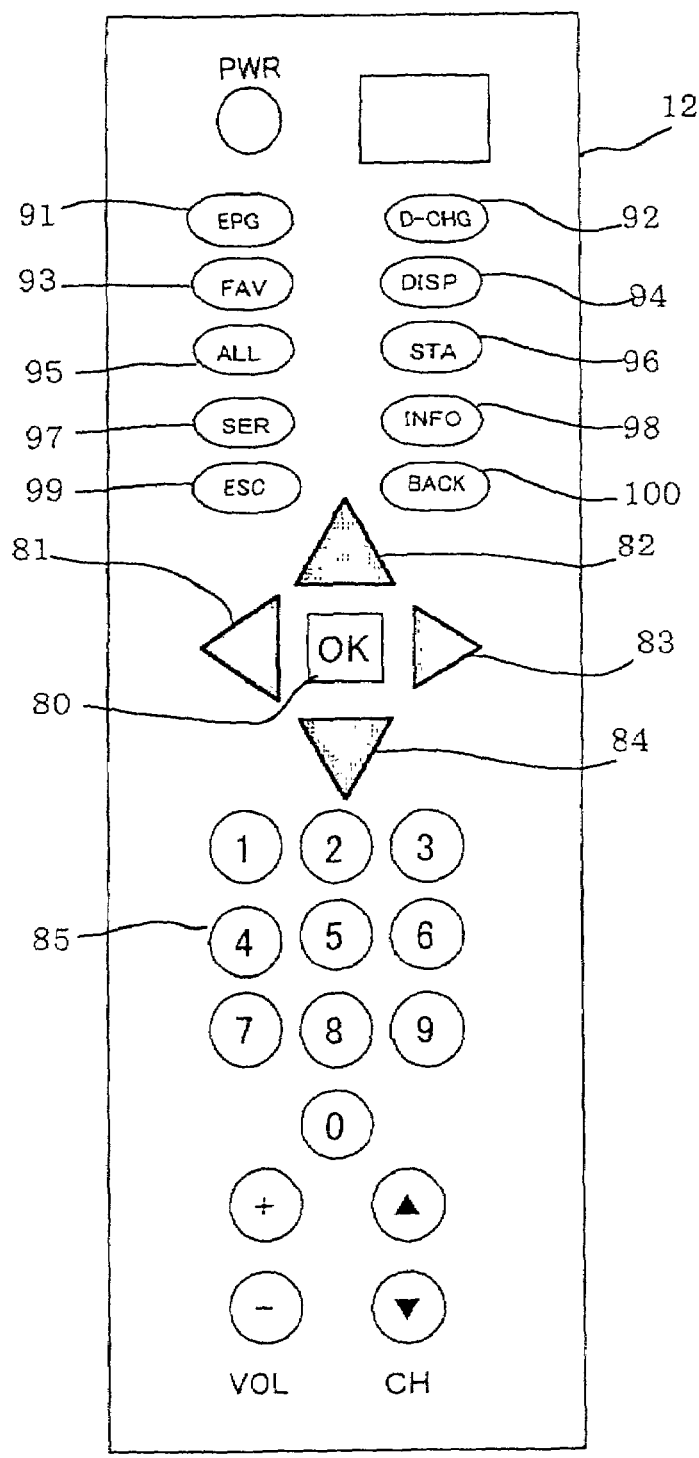
FIG. 9 shows the appearance of a remote control used together with the receiver of FIG. 1.

Next, the remote control 12 will be described. FIG. 9 shows the appearance of the remote control 12 used together with the digital receiver 1 of the present invention. Cursor Movement keys 81 to 84 are arranged substantially in the middle of the remote control 12, allowing the user to move the cursor 33 over the Day EPG 30 screen, the cursor 46 over the All EPG 40 screen, and other cursors.

For example, when the user viewing the Day EPG 30 screen presses the left arrow key 81, the cursor 33 is moved leftward one program cell, while when the user presses the right arrow key 83, the cursor 33 is moved rightward one program cell. Further, when the up arrow key 82 is pressed, the cursor 33 is moved up, while when the down arrow key 84 is pressed, the cursor 33 is moved down.

However, when the user places the cursor 33 or 46 over a program on the Day EPG 30 or All EPG 40 screen using the Cursor Movement keys 81 to 84, that program is selected, but the selection is not yet confirmed by the receiver 1 for subsequent processing. To confirm the selection of the program after placing the cursor 33 or 46 over the program, the user must press an "OK key" 80.

For example, when the user places the cursor 33 or 46 over the currently broadcast program cell in the Day EPG 30 or All EPG 40 screen by operating the relevant keys 81 to 84 and then presses the OK key 80, the receiver 1 tunes to the channel broadcasting the program in question for output of the picture and sound of the program to the display 22 and the audio speakers 23. When the OK key 80 is pressed again, a Record screen appears together with the picture of the program. By following instructions given on the Record screen, the user can record the program. This is how the user can view and/or record the program.

Further, when the user places the cursor 33 or 46 in the Day EPG 30 or All EPG 40 screen over the cell of a program to be aired at a future time using the Cursor Movement keys 81 to 84 and then presses the OK key 80, a Schedule screen appears for that program. By following instructions given on the Schedule screen, the user can schedule that program for viewing/recording.

Of the function keys provided on the upper part of the remote control 12, the "EPG key" 91 is used to display a regular Day EPG screen. When pressing the EPG key 91 while watching a program, the user can switch the display 22 screen from the program to the Day EPG 30 such as shown in FIG. 5. To return to the program from the Day EPG 30, the key 91 is pressed again. The "Day Change key" 92 to the right of the EPG key 91 is used to change the day of the week in the displayed program guide. The "Favorite Category key" 93 below the EPG key 91, when pressed, allows the user viewing the Day EPG 30 to add a category for a program selected by the cursor 33 to the program cell display management table 25 by setting the display priority level of that category to "A". This automatically marks all program cells 31 corresponding to the level "A" category in the Day EPG 30 with the Favorite Category icons 37. In one embodiment, a query screen through which the user determines categories ranked at a particular level or higher may be displayed upon pressing the Favorite Category key 93 to allow the user to set priority levels other than "A".

A "Display key" 94 to the right of the Favorite Category key 93, when pressed, allows the user watching a program or browsing one of the EPG screens to switch to a screen for setting the display priority level/display mode for program cells, such as, a Display Priority Level/Display Mode Setting screen 55 shown in FIG. 10, for example. The screen 55 is provided with setting areas 57 through which the user can enter desired display priority level/display mode settings by category. The entered settings are reflected in the program cell display management table 25. A mark 58 shown in the lower part of the screen 55 indicates that the user can scroll down the screen 55 to see more categories by moving a cursor 56 downward. In one embodiment, the Display Priority Level/Display Mode Setting screen 55 may be superimposed on the Day EPG and All EPG screens.

An "All-at-a-Glance key" 95 below the Favorite Category key 93 allows the user viewing a program to switch to an All EPG screen, such as the screen 40 shown in FIG. 6, for example, when pressed. To return to the program from the All EPG screen, the key 95 is pressed again.

Figure 11:
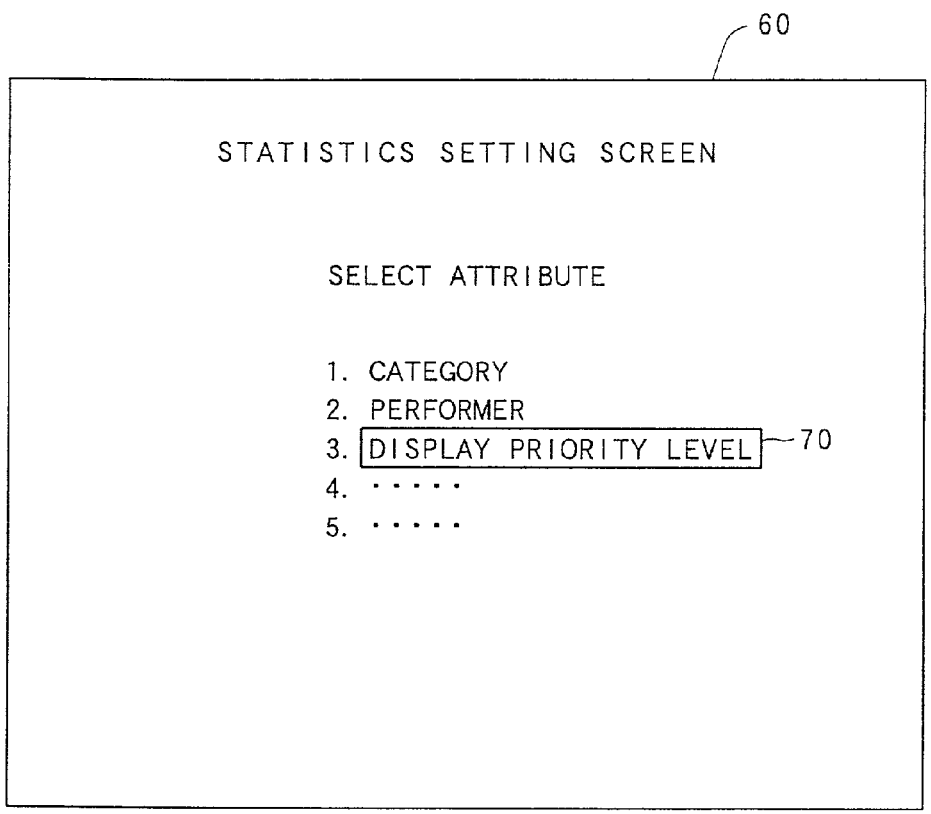
FIG. 11 shows an example of a Statistics Setting screen.

A "Statistics key" 96 to the right of the All-at-a-Glance key 95 allows the user browsing the All EPG screen to display the field 50 such as shown on the All EPG 40 screen in FIG. 7, when pressed. The user can move this field 50 using the Cursor Movement keys 81 to 84. When the user places the field 50 over a desired area and presses the OK key 80, a Statistics Setting screen 60 such as shown in FIG. 11 appears. This screen 60 allows the user to select an attribute on which to collect statistics for programs within the field 50 shown in FIG. 7. The above-mentioned statistical process (see FIG. 7) is performed based on the attribute selected over the Statistics Setting screen 60. In one embodiment, the screen 60 may be superimposed on the All EPG screen.

Figure 13:
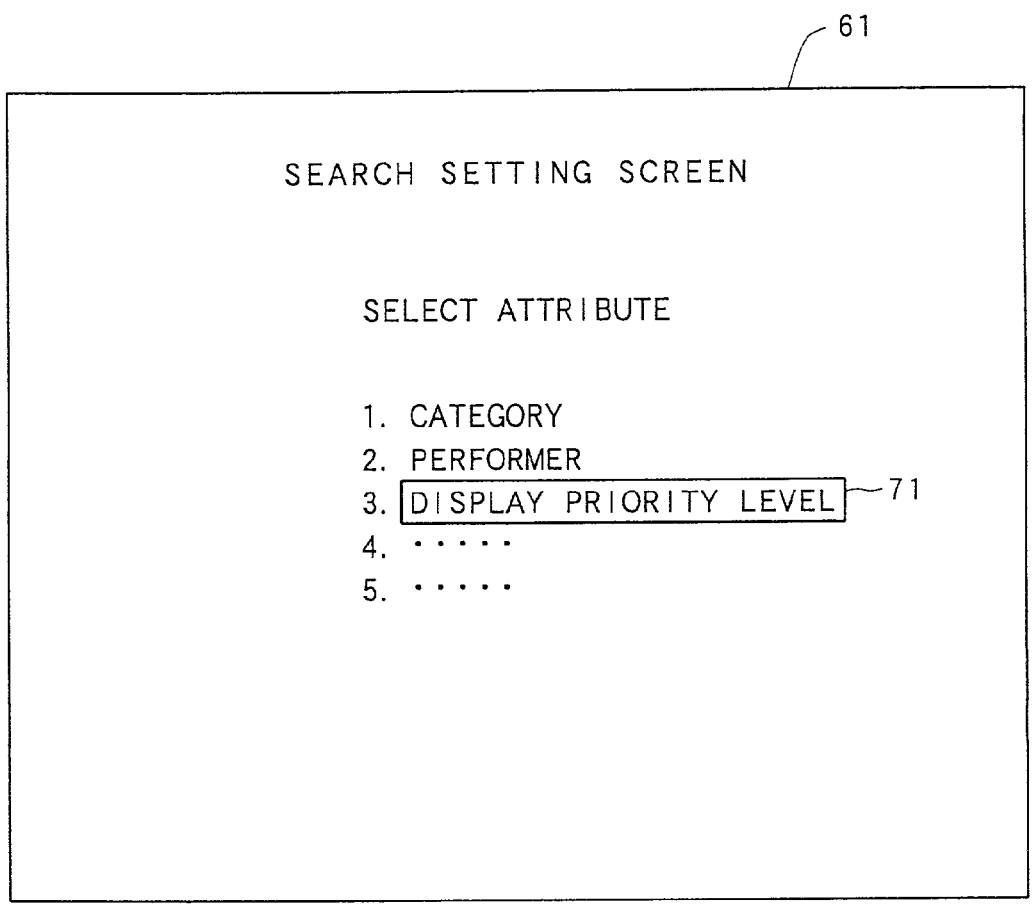
FIG. 13 shows an example of a Search Setting screen.

A "Search key" 97 below the All-at-a-Glance key 95 allows the user viewing the All EPG screen to switch to a Search Setting screen 61 such as shown in FIG. 13, when pressed. The screen 61 asks the user to select an attribute through which to search for an area satisfying a predetermined condition. The above-mentioned search process (see FIG. 8) is performed based on the attribute selected over the Search Setting screen 61. In one embodiment, the screen 61 may be superimposed on the All EPG screen.

An "Information key" 98 to the right of the Search key 97 allows the user viewing the Day EPG or All EPG screen to display a Detailed Information screen for a program selected by the cursor 33 or 46, when pressed. The Detailed Information screen (not shown) displays an in-depth description of the selected program, including, for example, details of the program (e.g., a synopsis of the program), information about whether the program is a conditional access program or not, information about the fact that the user cannot view the program due to the terms of contract, etc., together with the information displayed in the outline area 35 on the Day EPG screen or the information displayed in the subscreen 47 on the All EPG screen. The detailed program information is generated based on the corresponding individual SI in each of the above-mentioned TSs. The Detailed Information screen is associated with each of all the program cells listed in each EPG on a one-to-one basis.

An "ESC key" 99, which is below the Search key 97, is pressed to return to the program screen from an EPG screen. A "BACK key" 100 to the right of the ESC key 99 is used to undo the last action.

It should be noted that the other keys on the remote control 12 will not be described because they are used to receive ordinary TV programs and the like and hence have no direct bearing on the present invention.

Next, the operation of the satellite digital broadcast receiver 1 according to the embodiment will be described with reference to the flowcharts shown in FIGS. 16 through 23. It should be understood that the following processes are performed mainly by the CPU 17 of FIG. 1 that executes predetermined processing programs stored in the ROM 15 while controlling the RAM 16, the display processor 9, and other related components.

Figure 16:
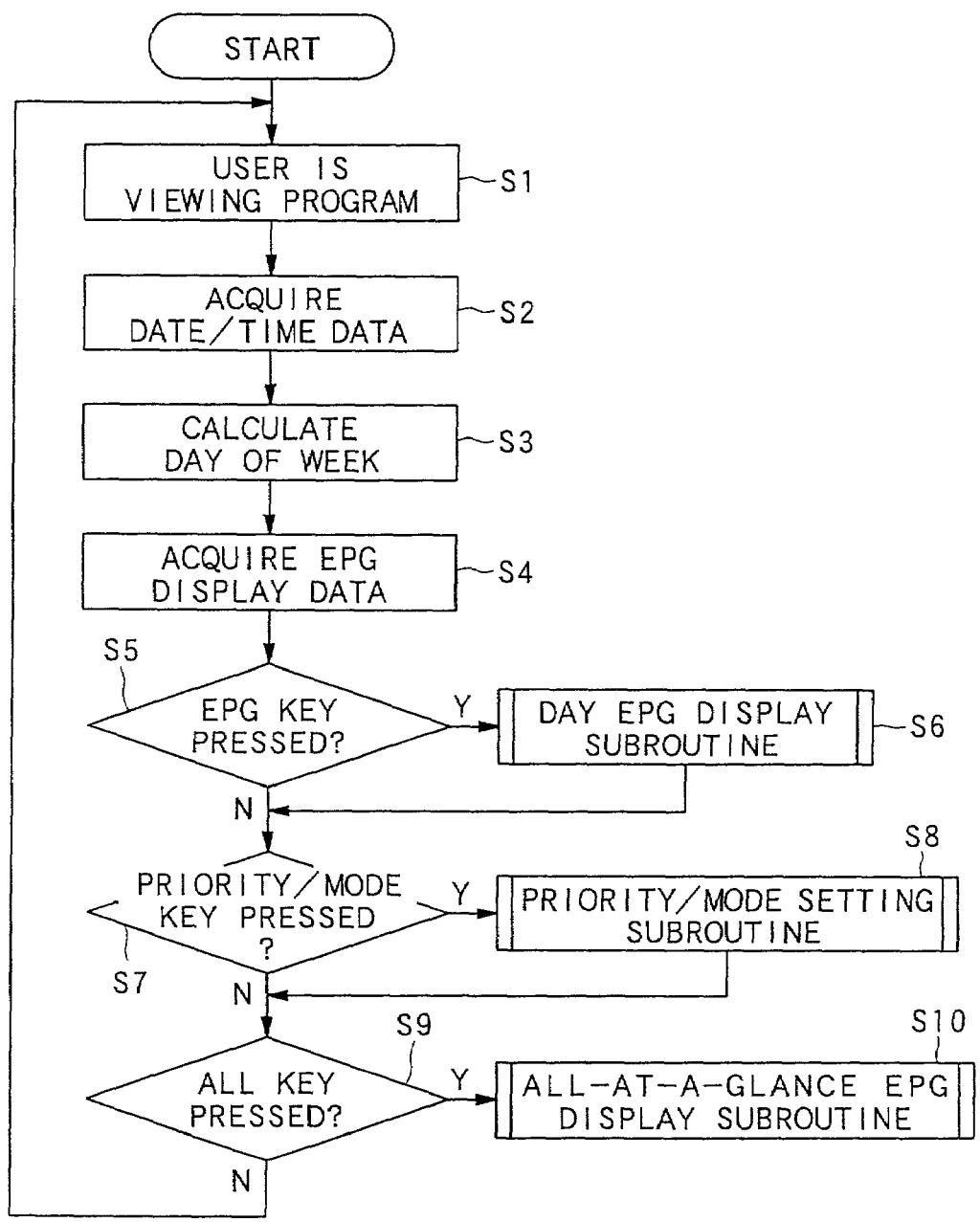
FIG. 16 is a flowchart showing a process executed by CPU 17 while a program is viewed.

FIG. 16 shows a main routine executed by the CPU 17 while the user is viewing a program. Let it be supposed that the user is receiving a desired channel by controlling the receiver 1 to view the program (step S1). First, the CPU 17 extracts the comprehensive SI from a TS of the tuned channel to acquire the date/time data included therein (step S2). In this system, the date/time data is managed by the broadcasting station transmitting the broadcast waves, and the current date/time data is included in the comprehensive SI. Thus, the CPU 17 acquires the date/time data from the transmitted waves. Then, the CPU 17 calculates the day of the week of "Today" or the current day from the acquired date/time data (step S3). Since day-of-the-week information is not usually included in the date/time data from the satellite, the CPU 17 specifies the day from the date/time data through a predetermined calendar-based computation. Then, EPG display data for 8 days from the current day is acquired as day cell data for the Day EPG based on the thus specified date/time and day data (step S4).

Next, when the user presses the EPG key 91, the CPU 17 detects this (step S5) to start a Day EPG displaying subroutine (step S6). When the user presses the Display key 94, the CPU 17 detects this (step S7) to start a display priority level/display mode setting subroutine (step S8). Further, when the user presses the All-at-a-Glance key 95, the CPU 17 detects this (step S9) to start an All EPG displaying subroutine (step S10).

Figure 17:
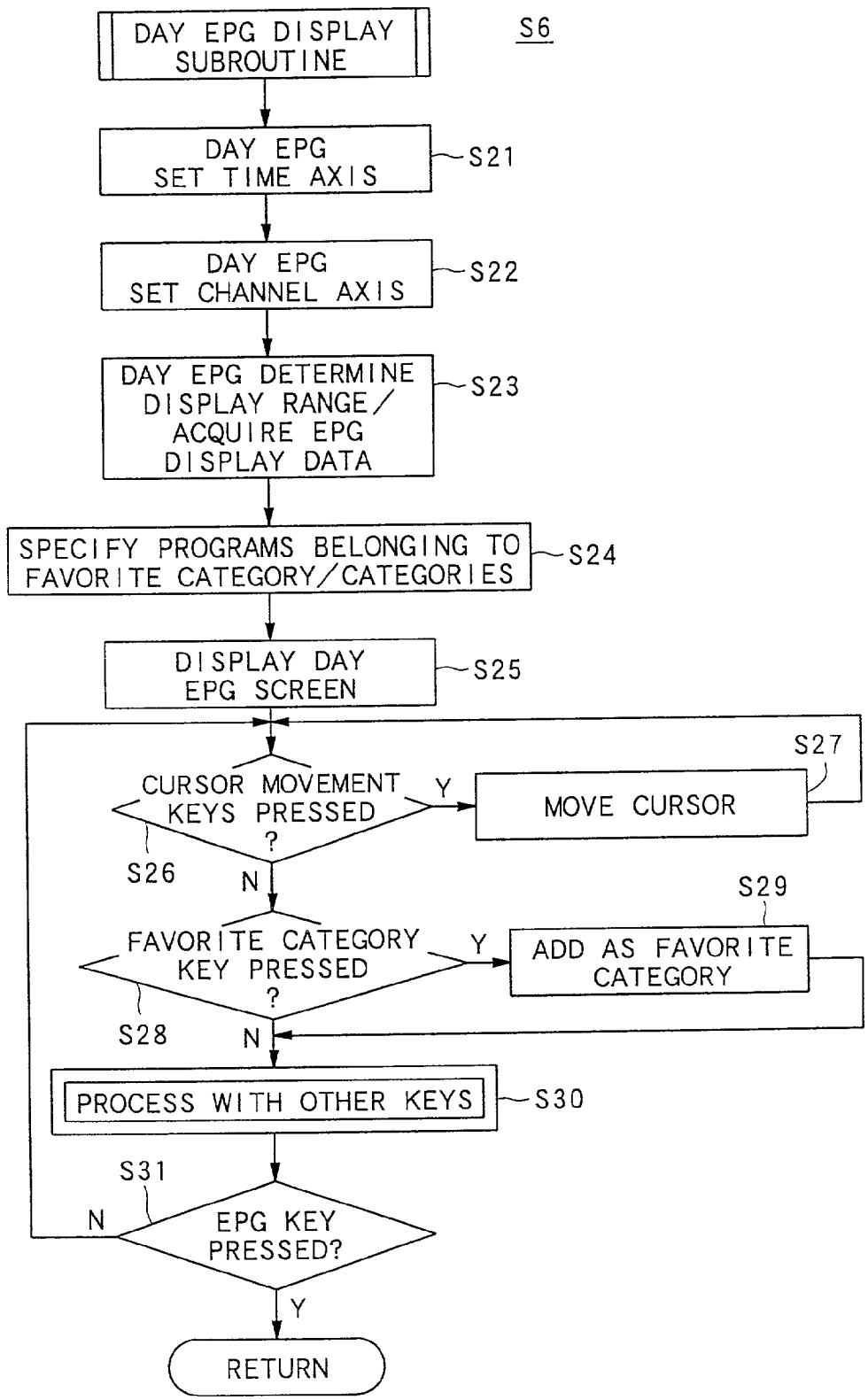
FIG. 17 is a flowchart showing a Day EPG displaying process executed in step S6 of FIG. 16.

FIG. 17 shows the Day EPG displaying subroutine executed in step S6 of FIG. 16. First, in the subroutine, the CPU 17 sets the day of a Day EPG for display to the current day, whereby "Today" is selected on the Day tab 34. Then, the CPU 17 sets the time axis of the Day EPG for display (step S21), by arranging the time slot area 29 such that the area 29 starts with a unit time including the current time.

Next, the CPU 17 sets the channel axis of the Day EPG for display (step S22); i.e., the channel axis displayed when the user pressed the EPG key 91 is maintained. Then, the CPU 17 determines the size of the program grid 32 and acquires EPG display data fit for the determined display range, from the SI (step S23). For example, if a program grid as large as m hours and n channels can be arranged by a receiver setting, then the CPU 17 determines the size as large as m hours from the starting time set in step S21 and n channels from the starting channel set in step S22, and acquires the EPG display data fit for the determined display range. Next, the CPU 17 references the program cell display management table 25 to specify programs belonging to a favorite category or categories from among programs listed in the program grid determined in step S23 (step S24).

Using the thus obtained EPG display data, the CPU 17 and the display processor 9 configure the program guide to display the Day EPG on the display 22, and at the same time, display the Favorite Category icons 37 in the cells of the programs specified in step S24 (step S25). This is how the Day EPG 30 such as shown in FIG. 5 is displayed. When the user presses the Cursor Movement keys 81 to 84 while viewing the Day EPG 30, the CPU 17 detects this (step S26) to move the cursor 33 in the directions corresponding to the pressed keys (step S27). If the user then presses the Favorite Category key 93, the CPU 17 detects this (step S28) to add the category for the program in the cell 31 selected by the cursor 33 as a level "A" category to the program cell display management table 25 (step S29). Further, in step S30 of FIG. 17, the CPU 17 executes processes corresponding to various key operations performed over the remote control 12. For example, when the Information key 98 is pressed with the Day EPG 30 displayed, the Detailed Information screen for the program selected by the cursor 33 is displayed. Further, the user can schedule programs for viewing/recording with the Day EPG 30 displayed, as mentioned above. When the EPG key 91 is pressed again (step S31), the CPU 17 returns to the process of FIG. 16, allowing the user to view the program.

Figure 18:
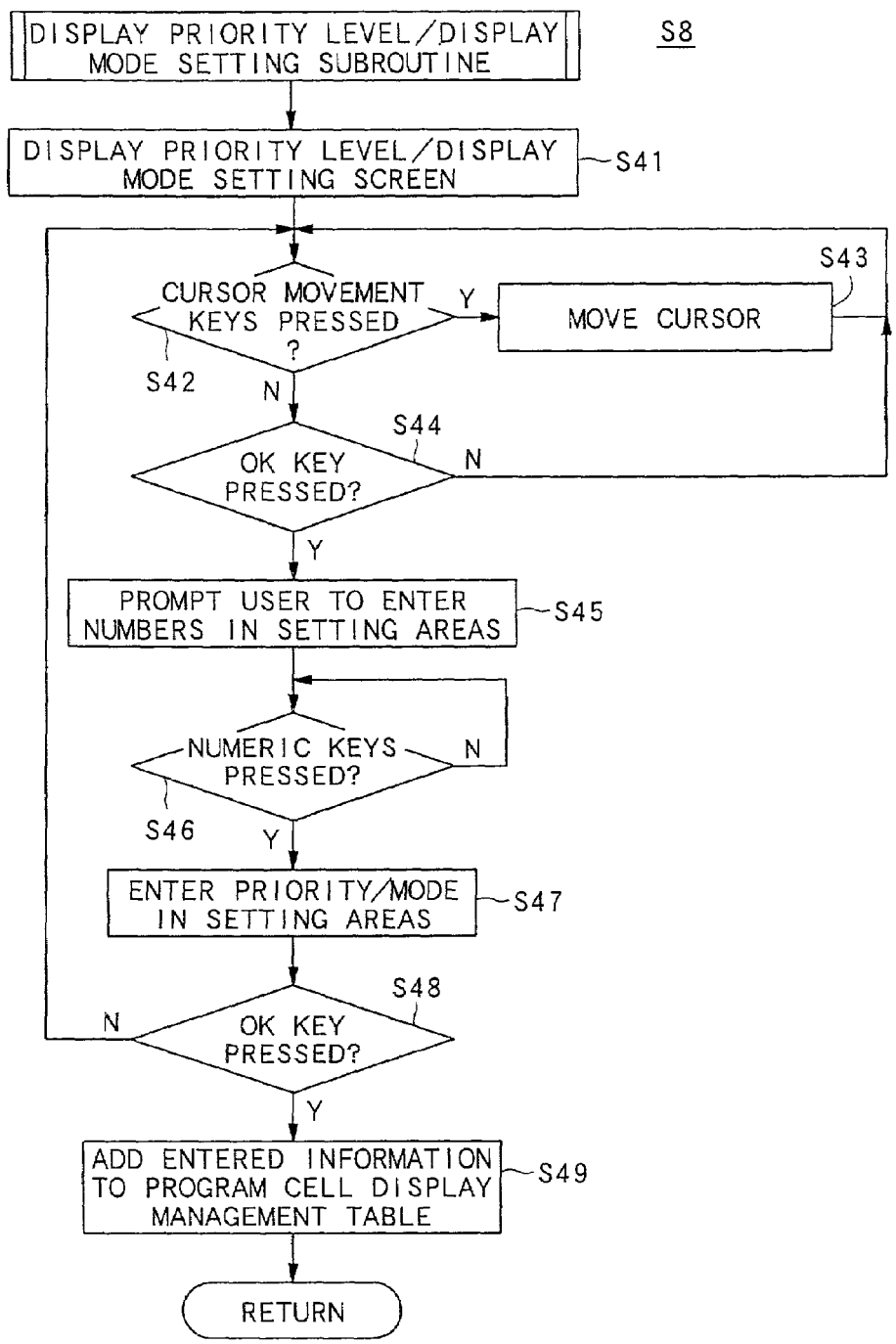
FIG. 18 is a flowchart showing a display priority level/display mode setting process executed in step S8 of FIG. 16.

FIG. 18 shows the display priority level/display mode setting subroutine executed in step S8 of FIG. 16. In the subroutine, first, a Display Priority Level/Display Mode Setting screen 55 such as shown in FIG. 10 is displayed (step S41). When the user presses the Cursor Movement keys 81 to 84 with this screen 55 displayed, the CPU 17 detects this (step S42) to move the cursor 56 in the directions corresponding to the pressed keys (step S43). When the user selects a desired setting area 57 with the cursor 56 and presses the OK key 80, the CPU 17 detects this (step S44) to prompt the user to enter a setting in the selected area 57 (step S45). When the user presses a desired numerical key 85 under this condition, the CPU 17 detects this (step S46) to enter (display) the display priority level or display mode corresponding to the pressed key 85 (step S47).

For example, a table in which display priority levels/display modes are associated with numbers is stored in the RAM 16 in advance, so that when the numerical key 85 corresponding to a display priority level or mode is pressed, such a display priority level or mode is entered (displayed) in the setting area 57.

When the display priority levels and modes are entered for all the categories in this way and the OK key is then pressed, the CPU 17 detects this (step S48) to add these settings entered in the setting areas 57 to the program cell display management table 25 stored in the RAM 16 (step S49). At the same time, the CPU 17 removes the Display Priority Level/Display Mode Setting screen 55, and returns to the process of FIG. 16, allowing the user to view the program. In one embodiment, instead of entering a display priority level and a display mode for each category one by one, a recommended display priority level and a recommended display mode are stored for each category in the program cell display management table 25 in advance such that the user can change such recommended priority levels/modes stored in the table 25 as to some of the categories only when he/she wishes to do so, through the Display Priority Level/Display Mode Setting screen 55.

Figure 19:
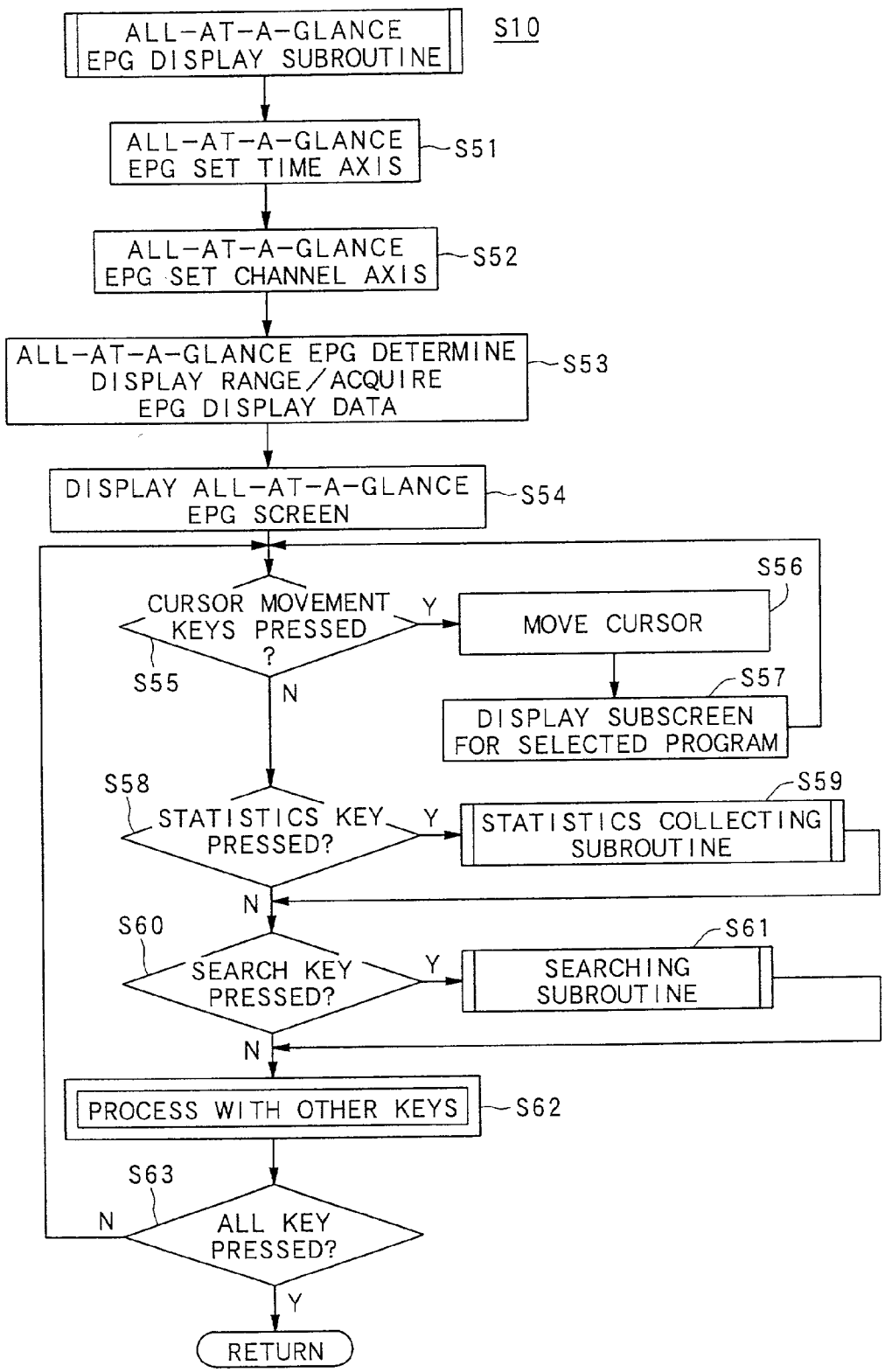
FIG. 19 is a flowchart showing an All-at-a-Glance EPG displaying process executed in step S10 of FIG. 16.

FIG. 19 shows the All EPG displaying subroutine executed in step S10 of FIG. 16. Similarly, in the All EPG displaying subroutine, first, the CPU 17 sets the day of an All EPG for display to the current day, whereby "Today" is selected on the Day tab 34. Then, the CPU 17 sets the time axis of the Day EPG for display (step S51).

Next, the CPU 17 sets the channel axis of the Day EPG for display (step S52); i.e., the channel axis displayed when the user pressed the All key 95 is maintained. Then, the CPU 17 determines the size of the program grid and acquires EPG display data fit for the determined display range, from the SI (step S53). Although these steps S51 to S53 are similar to those performed to display the Day EPG screen, the display range of the All EPG for display is far larger than that of the Day EPG in terms of the number of cells displayed, as mentioned above.

Next, the CPU 17 and the display processor 9, using the thus obtained EPG display data and referencing the program cell display management table 25, configure the program guide to display the All EPG on the display 22 (step S54). That is, the cells of programs which are included in the determined display range for display are displayed on the All EPG according to the display priority levels, display flags, and display modes corresponding to the categories to which the programs belong, respectively. This is how the All EPG 40 such as shown in FIG. 6 is displayed. Although the time slot area starts at 5 p.m. in the example of FIG. 6, the same area may start at 7 p.m. so as to match with that of the Day EPG 30 of FIG. 5. When the user presses the Cursor Movement keys 81 to 84 with the All EPG 30 displayed, the CPU 17 detects this (step S55) to move the cursor 46 in the directions corresponding to the pressed keys (step S56). Further, as to a program cell 44 selected by the cursor 46, the subscreen 47 appears in a mode related to the display mode specified for that program cell 44, and its program information is displayed in the subscreen 47 (step S57). If the user then presses the Statistics key 96, the CPU 17 detects this (step S58) to start the statistics collecting subroutine (step S59). If, on the other hand, the Search key 97 is pressed, the CPU 17 detects this (step S60) to start the searching subroutine (step S61). In step S62 of FIG. 19, processes corresponding to various key operations performed on the remote control 12 are executed similarly to step S30 of FIG. 17. Further, when one of the numerical keys 85 is pressed in step S62, the display priority level corresponding to the pressed key is displayed in FIG. 6 as denoted by reference numeral 45, which is reflected in the program cell display management table 25 by setting the corresponding display flag to "1", and the cells 44 of programs falling into the categories ranked at that display priority level or higher are displayed on the All EPG 40 screen in the display modes specified for the respective categories. Further, when the All-at-a-Glance key 95 is pressed again (step S63), the CPU 17 returns to the process of FIG. 16, allowing the user to view the program.

Figure 20:
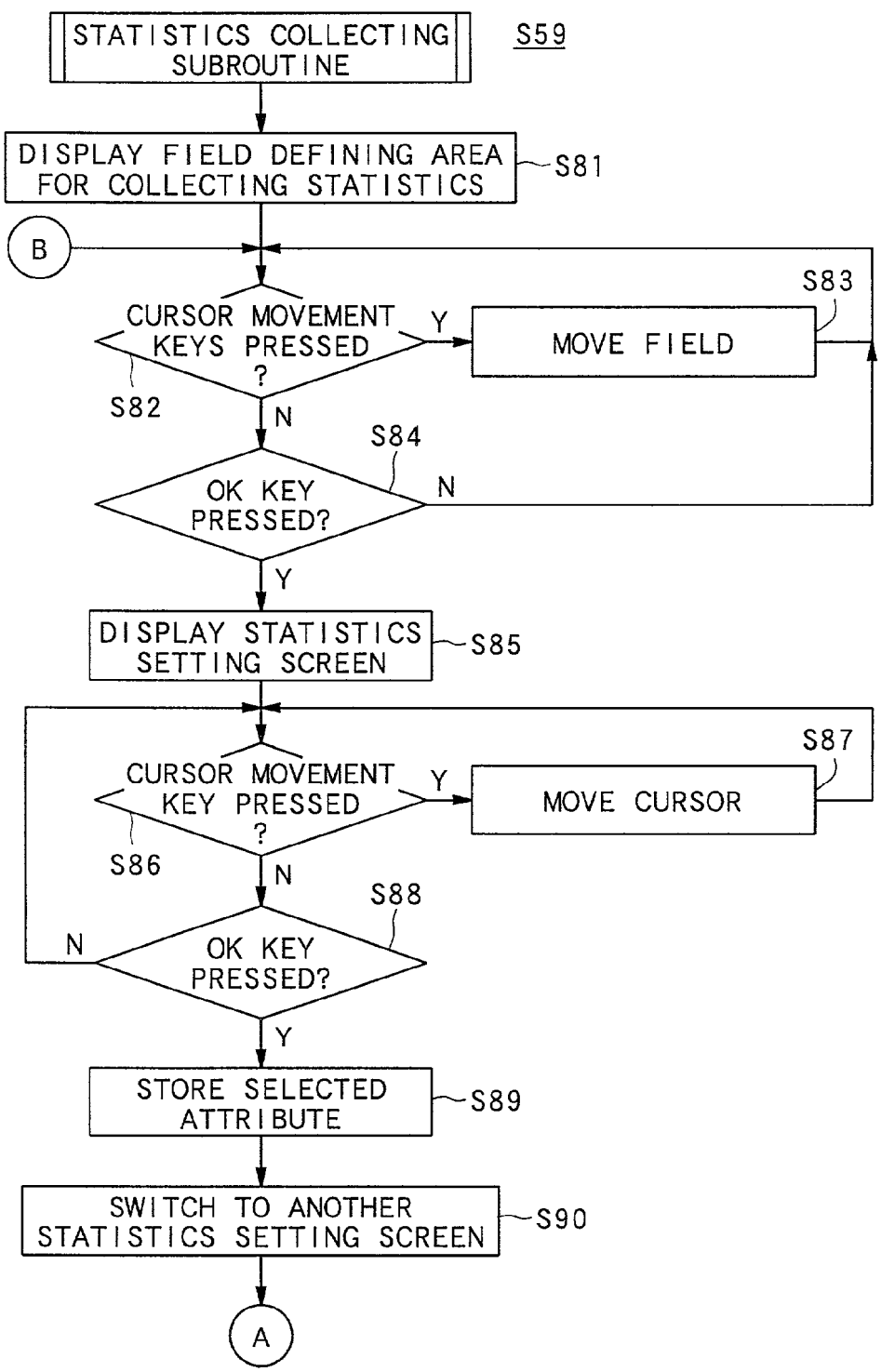
FIG. 20 is a flowchart showing a statistical process executed in step S59 of FIG. 19.
Figure 21:
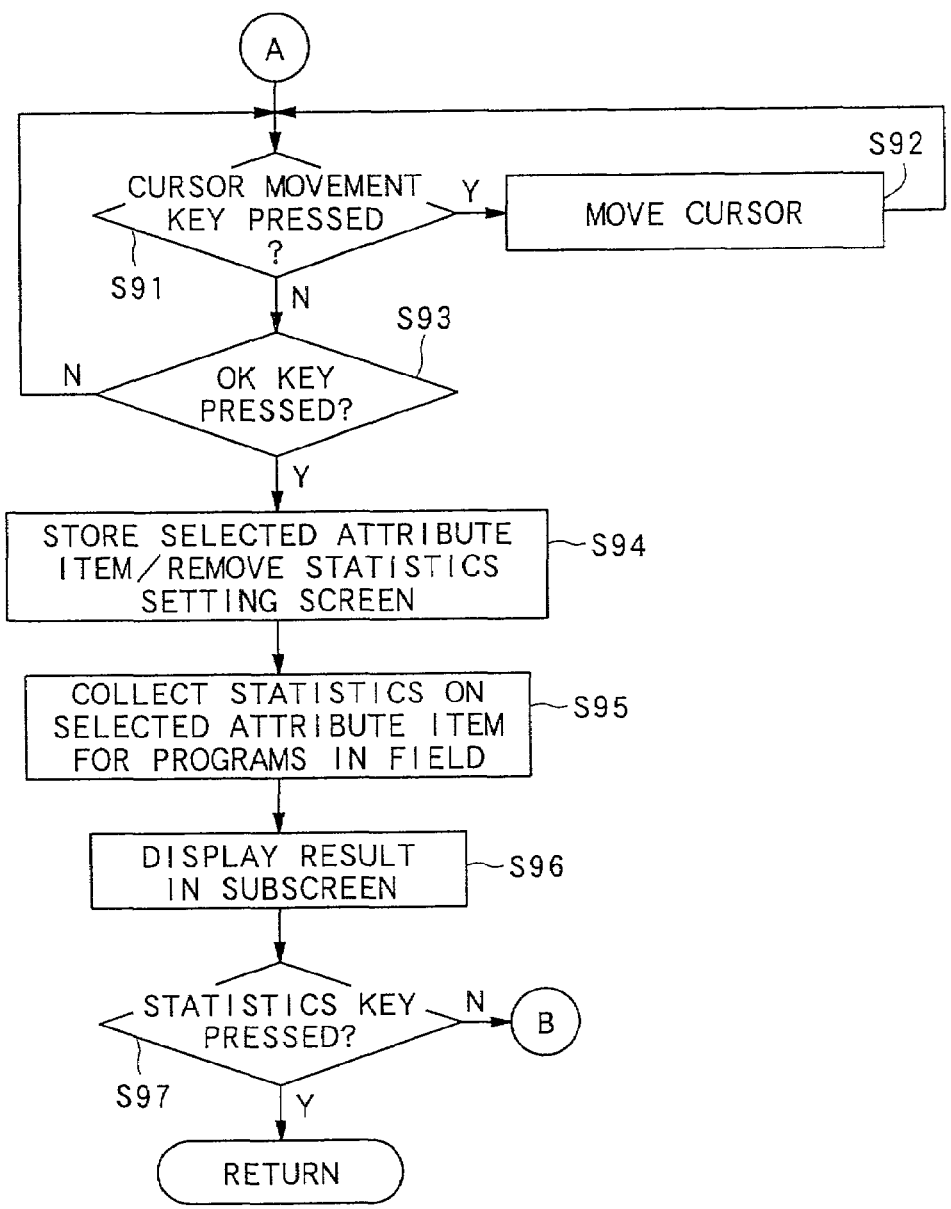
FIG. 21 is a flowchart showing a continuation of the statistical process executed in step S59 of FIG. 19.

FIGS. 20 and 21 show the statistics collecting subroutine executed in step S59 of FIG. 19. In the subroutine, the field 50 defining an area for a statistical process is displayed on the All EPG 40 screen (step S81). When the user presses the Cursor Movement keys 81 to 84 while viewing the same screen, the CPU 17 detects this (step S82) to move the field 50 in the directions corresponding to the pressed keys (step S83), whereby the user selects a desired area with the field 50. When the user then presses the OK key 80, the CPU 17 detects this (step S84) to display the Statistics Setting screen 60 such as shown in FIG. 11, in place of or while superimposed on the All EPG 40 screen (step S85).

Then, when the user presses the Cursor Movement key 82 or 84 over the Statistics Setting screen 60 of FIG. 11, the CPU 17 detects this (step S86) to move a cursor 70 in the direction corresponding to the pressed key (step S87), whereby the user selects an attribute (the display priority level in the example of FIG. 11) on which to collect statistics. When the user then presses the OK key 80, the CPU 17 detects this (step S88) to store the selected attribute in the RAM 16 (step S89). Then, the CPU 17 switches to another Statistics Setting screen 60 such as shown in FIG. 12 (step S90).

Figure 12:
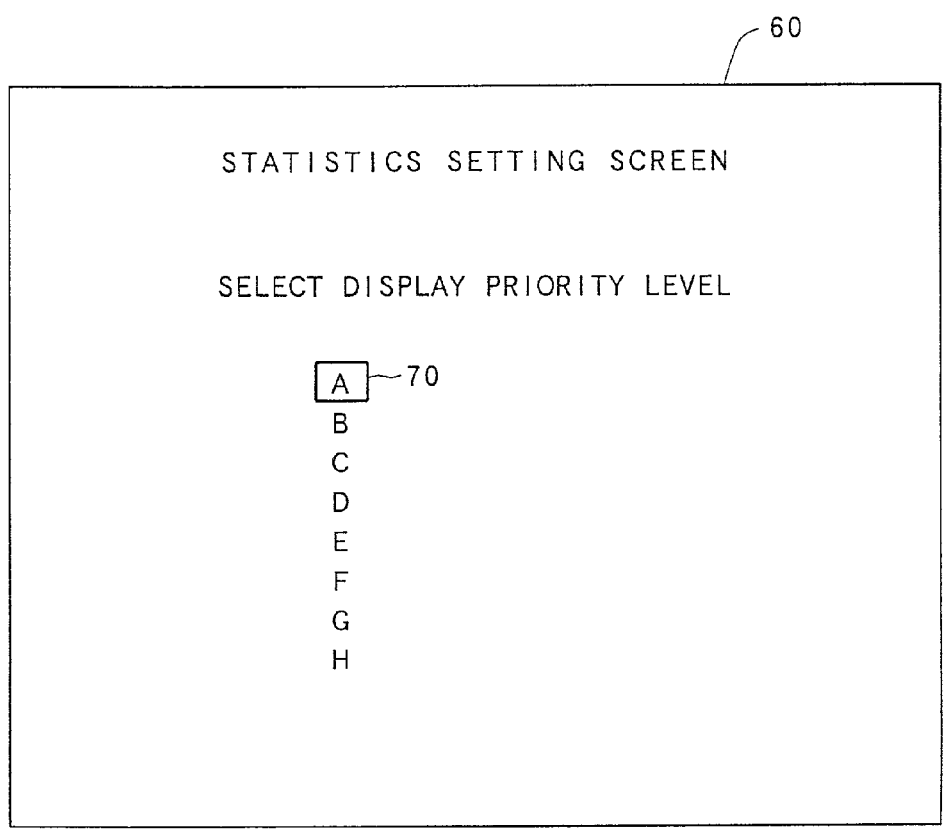
FIG. 12 shows an example of another Statistics Setting screen.

Next, as shown in FIG. 21, when the user presses the Cursor Movement key 82 or 84 over the Statistics Setting screen 60 of FIG. 12, the CPU 17 detects this (step S91) to move the cursor 70 in the direction corresponding to the pressed key (step S92), whereby the user selects an item on which to collect statistics (the display priority level "A" in the example of FIG. 12) with the cursor 70. When the user presses the OK key 80, the CPU 17 detects this (step S93) to store the selected item in the RAM 16, and at the same time, removes the Statistics Setting screen 60 to display the All EPG 40 on the display 22 (step S94). Then, the CPU 17 collects statistics on the selected item of the selected attribute for the programs included in the field 50 (step S95), and displays the statistical result in the subscreen 51 (step S96). Thus, the statistics are collected on the level "A" category for the relevant programs, and the result that there are seven such programs is displayed on the subscreen 51. When the Statistics key 95 is pressed again, the CPU 17 returns to the process of FIG. 19.

Figure 22:
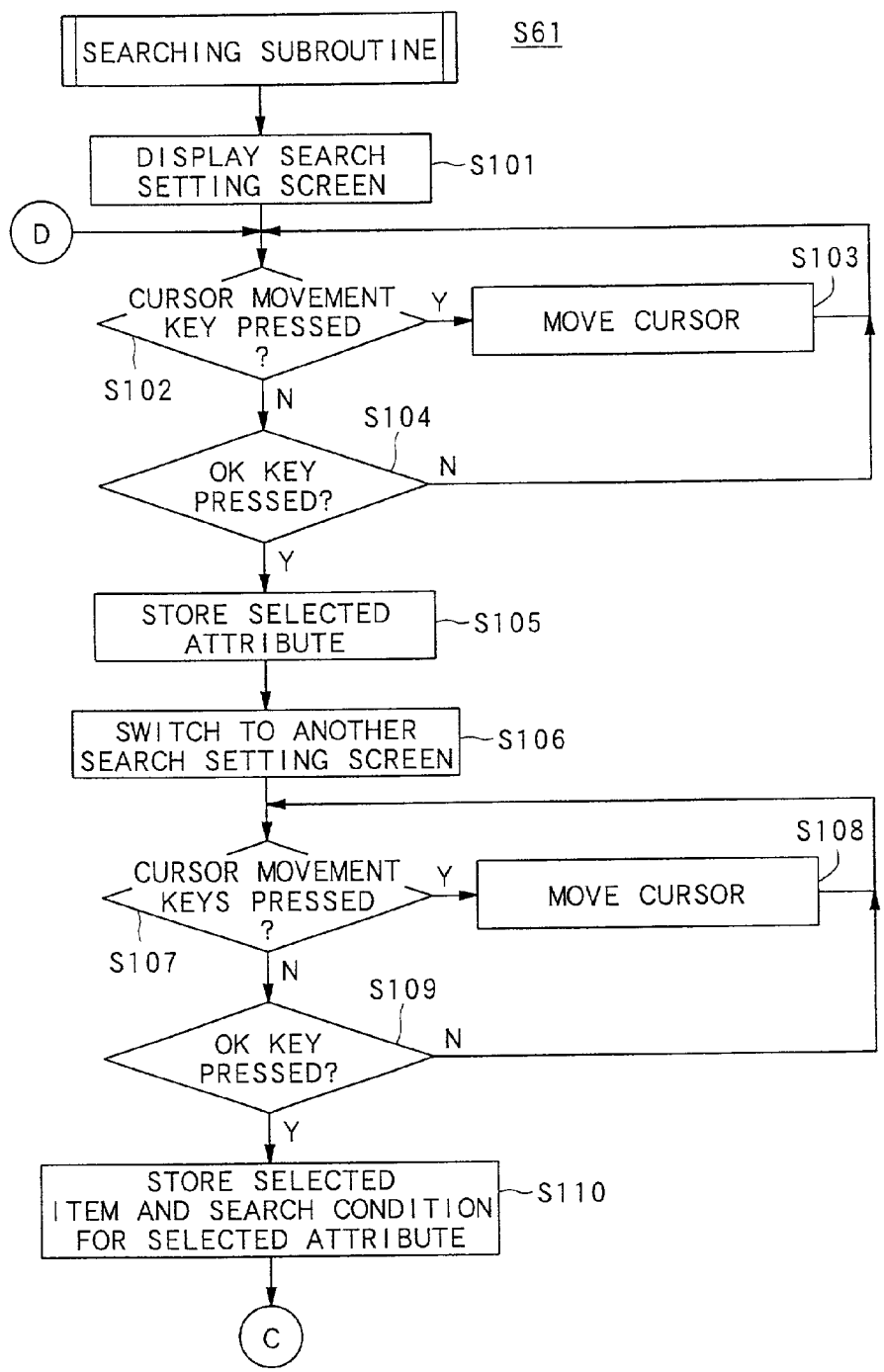
FIG. 22 is a flowchart showing a search process executed in step S61 of FIG. 19.

FIG. 22 shows the searching subroutine executed in step S61 of FIG. 19. In the subroutine, first, the Search Setting screen 61 such as shown in FIG. 13 is displayed in place of or while superimposed on the All EPG 40 screen (step S101).

Then, when the user presses the Cursor Movement key 82 or 84 over the Search Setting screen 61 of FIG. 13, the CPU 17 detects this (step S102) to move a cursor 71 in the direction corresponding to the pressed key (step S103), whereby the user selects an attribute for search (the display priority level in the example of FIG. 13) with the cursor 71. When the user then presses the OK key 80, the CPU 17 detects this (step S104) to store the selected attribute in the RAM 16 (step S105). Then, the CPU 17 switches to another Search Setting screen 61 such as shown in FIG. 14 (step S106).

Figure 14:
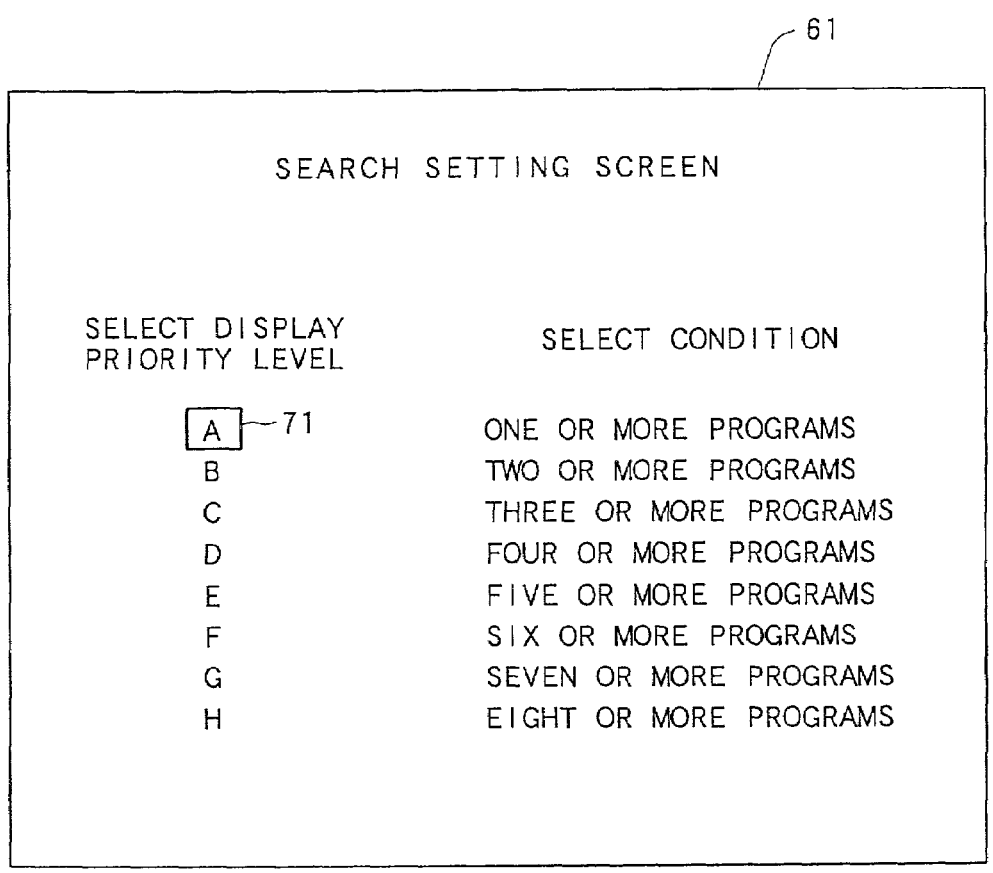
FIG. 14 shows an example of another Search Setting screen.

Next, when the user presses the Cursor Movement keys 81 to 84 over the Search Setting screen 61 of FIG. 14, the CPU 17 detects this (step S107) to move the cursor 71 in the directions corresponding to the pressed keys (step S108), whereby the user selects an item for search (the display priority level "A" in the example of FIG. 14) with the cursor 71, as well as a search condition ("five or more programs" in the same example). When the user presses the OK key 80 thereafter, the CPU 17 detects this (step S109) to store the selected item and search condition of the selected attribute in the RAM 16 (step S110).

Figure 23:
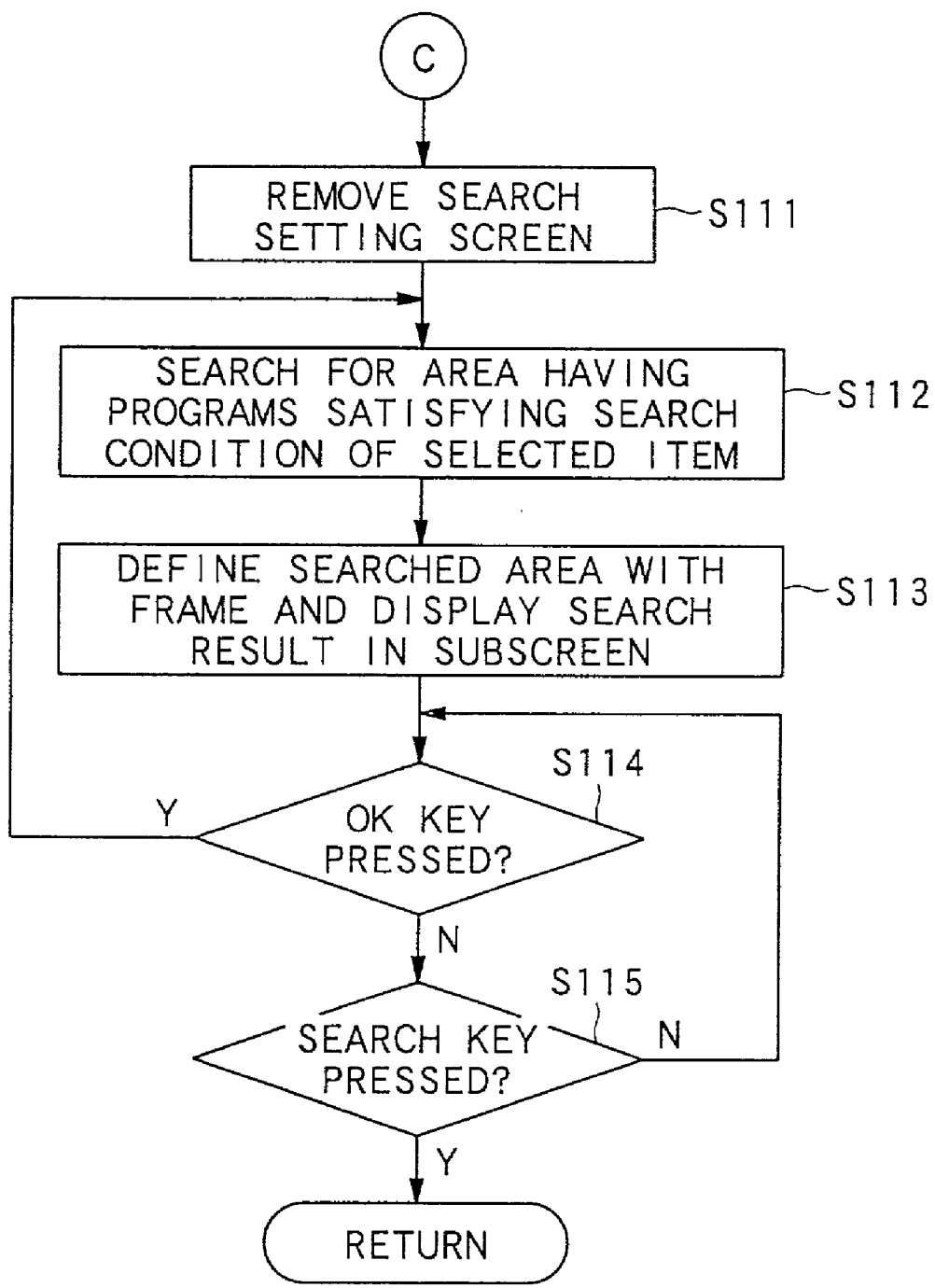
FIG. 23 is a flowchart showing a continuation of the search process executed in step S61 of FIG. 19.

Thereafter, the CPU 17 removes the Search Setting screen 61, as shown in FIG. 23 (step S111). Next, the CPU 17 searches for such an area as satisfying the selected search condition for the selected attribute item (step S112) to display the searched area defined by the field 52 and also the search result in the subscreen 53 (step S113). Thus, the area including 5 or more programs belonging to the level "A" category is displayed as the field 52, and the information that there are 8 such programs in the searched area is displayed in the subscreen 53.

Figure 15:
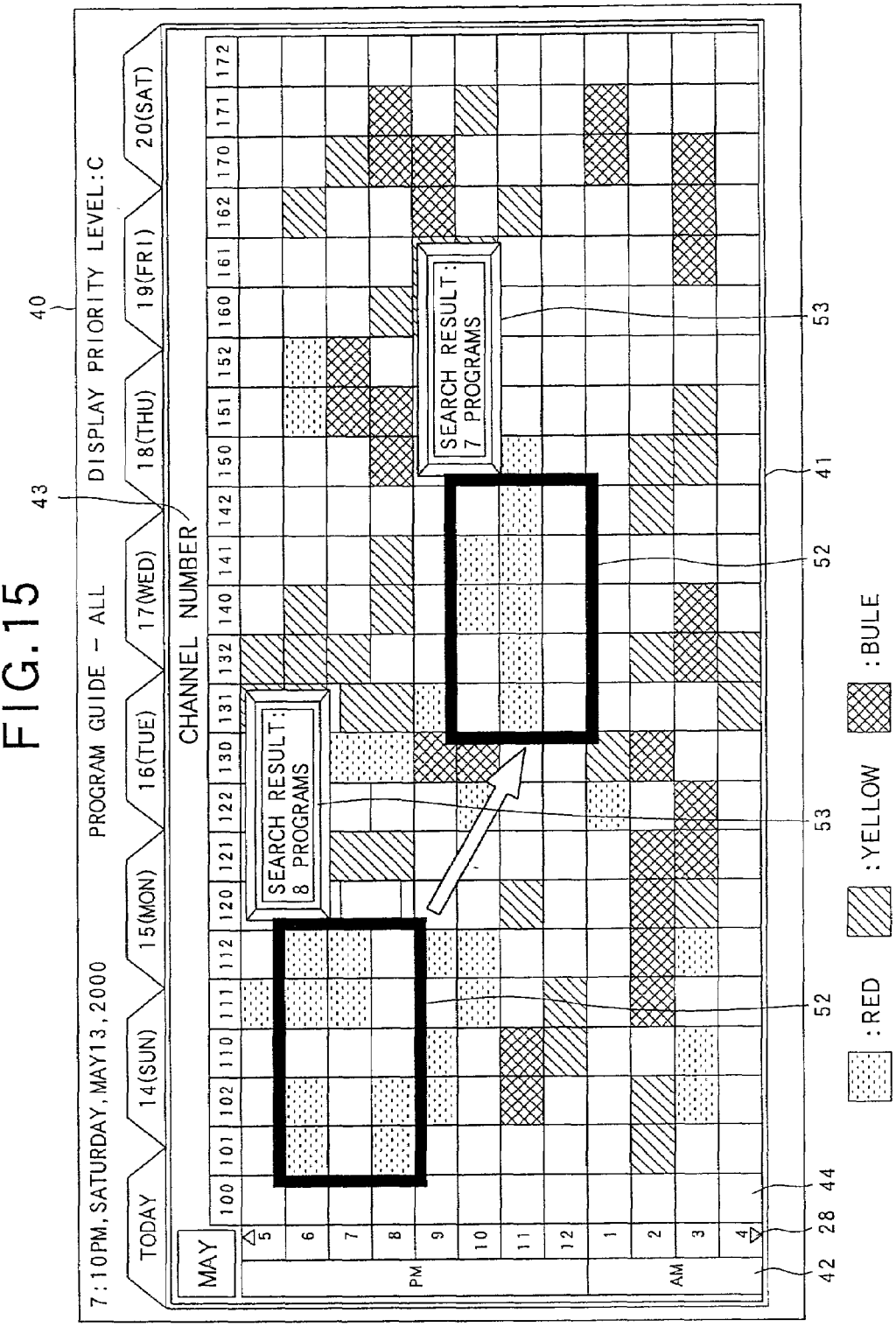
FIG. 15 shows an example of the result of a search for another area under the same condition as in FIG. 8.

Thereafter, the user presses the OK key 80 again under the same display condition, the CPU 17 detects this (step S114) to search for such an area as satisfying the search condition other than the one searched in step S109 (i.e., to cause the field 52 to jump to another area) and define the newly searched area with the field 52 and also indicate the search result in the associated subscreen 53. That is, pressing the OK key 80 again means accepting the instruction to move an area for search. Thus, the field 52 and the subscreen 53 move or "jump" to the next searched area, as shown in FIG. 15. The field 52 and the subscreen 53 similarly jump thereafter every time the OK key 80 is pressed. When the Search key 96 is pressed again (step S115), the CPU 17 returns to the process of FIG. 19.

As described above, the All EPG according to the above embodiments allows a far greater number of program cells to be displayed within a single screen than the regular Day EPG, etc., and further allows the program cells to be displayed in different modes by category, whereby the user can locate time slots and channels which are crowded with broadcast programs belonging to a particular category or categories, at a glance through a screen displaying a larger number of program cells.

Further, the user can rank his/her favorite categories by setting display priority levels, and display the cells of only programs belonging to such categories as being ranked at a particular level or higher in user-selected display modes, whereby the user can check time slots and channels which are packed with programs belonging to his/her favorite categories quickly. Additionally, by setting uninteresting categories to low priority levels, the cells of programs belonging to such low level categories can be displayed less conspicuously in the All EPG, whereby the user can create his/her own program guide.

In the above embodiments, the user is allowed to set the display priority level arbitrarily. In other embodiments, the priority level may be set automatically according to a history of user performed operations. For example, a View history, a Record history, a To-View history, and a To-Record history may be stored in the RAM 16 such that the display priority level can be set automatically according to frequency.

Further, in another embodiment, in the searching subroutine described with reference to FIG. 22, the CPU 17 may search for an area having the cells of programs frequently viewed according to the View history, for display as the field 52 together with the search result in the associated subscreen 53, and may additionally cause the field 52 to jump.

Further, in still another embodiment, the user may be allowed to select favorite channels and time slots in the All EPG, and display a program guide showing only those channels and time slots selected as his/her favorites.

In yet another embodiment, only a program grid having a number of programs equal to or greater than a specified number are present with respect to a certain channel and time slot is displayed, and the user may specify that number arbitrarily.

In some other embodiments, channels, time slots, etc. which are frequently tuned to by the user may be determined by investigating the View history, and added to a database, and only an area or areas which are crowded with programs which it is thought the user likes may be displayed based on the result of the investigation.

While the above embodiments are applied to satellite broadcast programs, the present invention is not limited to them, but can be applied to, for example, systems for airing programs with dedicated cables and systems for airing programs via public networks, such as the Internet. Further, while the EPG screens are displayed on the TV display in the above embodiments, the present invention is not limited to them. The EPG screens may be displayed on a personal computer monitor, etc.

As described in the foregoing, the present invention enables a greater number of program cells to be displayed within a single screen, and hence allows the user to recognize an area or areas crowded with programs belonging to his/her favorite categories quickly.

The entire disclosure of Japanese Patent Application No. 2000-317789 filed on Oct. 18, 2000 including the specification, claims, drawings and summary is incorporated herein by reference in its entirety.

What is claimed is:

1. A program guiding apparatus comprising:
a storing device for storing program information including a category to which a program belongs;
a display priority setting device for setting a display priority level for displaying a program cell corresponding to said category;
a display mode setting device for setting a display mode for displaying said program cell corresponding to said category;
a generating device for generating a program guide in which a plurality of program cells are arranged two-dimensionally based on said display priority level, said display mode, and said program information;
a displaying device for displaying said generated program guide on a two-dimensional screen;
an accepting device for accepting a designation of an area including at least two of said program cells on said displayed program guide; and
a collecting device for collecting statistics on a predetermined program attribute for at least one program corresponding to at least one of said program cells included in said designated area,
wherein said a displaying device displays said designated predetermined area and said statistics.

2. The program guiding apparatus according to claim 1, further comprising:
a search device for searching for an area in which a predetermined program attribute satisfies a predetermined condition, in said program guide, and indicating said searched area in said program guide.

3. The program guiding apparatus according to claim 2, wherein:
said accepting device accepts a direction to move said searched area, and
said search device searches for another area in which said predetermined program attribute satisfies said predetermined condition, other than said previously searched area, every time said search device accepts said direction to move the area.

4. The program guiding apparatus according to claim 1, wherein said display priority level is automatically set based on a viewing history by a user.

5. The program guiding apparatus according to claim 1, wherein said display priority level is set by a user.

6. The program guiding apparatus according to claim 1, wherein said display mode includes a shape, a pattern, or a color of a program cell, or combinations thereof.

7. The program guiding apparatus according to claim 1, wherein there are a plurality of categories, and wherein further said display priority level and said display mode are set for each of said plurality of categories to display program cells corresponding to said each of said plurality of categories.

8. The program guiding apparatus according to claim 1, wherein said display priority level is automatically set based on a recording history by a user.

9. A program guiding method, comprising:
storing program information including a category to which a program belongs;
setting a display priority level for displaying a program cell corresponding to said category;
setting a display mode for displaying said program cell corresponding to said category;
generating a program guide in which a plurality of program cells are arranged two-dimensionally based on said display priority level, said display mode, and said program information;
displaying said generated program guide on a two-dimensional screen;
accepting a designation of an area including at least two of said program cells on said displayed program guide; and
collecting statistics on a predetermined program attribute for at least one program corresponding to at least one of said program cells included in said designated area,
wherein said a displaying device displays said designated predetermined area and said statistics.

10. A program guiding apparatus comprising:
a storing device for storing program information including a category to which a program belongs;
a display priority setting device for setting a display priority level for displaying a program cell corresponding to said category;
a display mode setting device for setting a display mode for displaying said program cell corresponding to said category;
a generating device for generating a program guide in which a plurality of program cells are arranged two-dimensionally based on said display priority level, said display mode, and said program information;
a displaying device for displaying said generated program guide on a two-dimensional screen;
an accepting device for accepting a selection of one program cell of said plurality of program cells arranged on said displayed program guide and for accepting a designation of an area including at least two program cells of said program cells on said displayed program guide,
wherein said generating device generates an information display screen based on a mode related to said display mode for displaying said selected program cell;
a collecting device for collecting statistics on a predetermined program attribute for at least one program corresponding to at least one of said program cells included in said designated area, wherein said a displaying device displays said information display screen, said designated predetermined area, and said statistics.

11. A program guide apparatus, comprising:
a memory that stores a first category corresponding to a first program and a second category corresponding to a second program; and
a control circuit that generates a program guide containing a first program cell corresponding to the first program and a second program cell corresponding to the second program,
wherein the control circuit assigns the first category with a first priority and assigns the second category with a second priority based on a preference of a user; and
a display that simultaneously displays the first program cell and the second program cell in the program guide, that the displays a first visual indication that indicates that the first program cell is assigned to the first priority, and that the displays a second visual indication that indicates that the second program cell is assigned to the second priority.

12. The program guide apparatus as claimed in claim 11, wherein said control circuit determines said preference of the user based on a program viewing history of the user.

13. The program guide apparatus as claimed in claim 11, wherein said control circuit determines said preference of the user based on a user input that associates the first category with the first priority and associates the second category with the second priority.

14. The program guide apparatus according to claim 11, wherein said first visual indication comprises displaying the first program cell with a first shape and the second visual indication comprises displaying the second program cell with a second shape.

15. The program guide apparatus according to claim 11, wherein said first visual indication comprises displaying the first program cell with a first color and the second visual indication comprises displaying the second program cell with a second color.

16. The program guide apparatus according to claim 11, wherein said first visual indication comprises displaying the first program cell with a first pattern and the second visual indication comprises displaying the second program cell with a second pattern.

17. The program guide apparatus according to claim 11, wherein said first visual indication comprises displaying the first program cell with at least one of a first shape, a first color, and a first pattern and the second visual indication comprises displaying the second program cell with at least one of a second shape, a second color, and a second pattern.

18. The program guide apparatus as claimed in claim 11, wherein said control circuit determines said preference of the user based on a program recording history of the user.

* * * * *